United States Patent
Ota et al.

(10) Patent No.: US 7,983,009 B2
(45) Date of Patent: Jul. 19, 2011

(54) MAGNETIC RECORDING/REPRODUCING SYSTEM, AND THIN-FILM MAGNETIC HEAD HAVING SHIELD LAYERS OF SPECIFIED WIDTHS

(75) Inventors: Norikazu Ota, Tokyo (JP); Tetsuya Roppongi, Tokyo (JP)

(73) Assignee: TDK Corporation, Tokyo (JP)

(*) Notice: Subject to any disclaimer, the term of this patent is extended or adjusted under 35 U.S.C. 154(b) by 1078 days.

(21) Appl. No.: 11/749,930

(22) Filed: May 17, 2007

(65) Prior Publication Data

US 2007/0274003 A1    Nov. 29, 2007

(30) Foreign Application Priority Data

May 23, 2006   (JP) ................................. 2006-142374

(51) Int. Cl.
G11B 5/31 (2006.01)
G11B 5/39 (2006.01)

(52) U.S. Cl. .................. 360/319; 360/317; 360/125.3
(58) Field of Classification Search .............. 360/76, 360/319, 125.3, 317
See application file for complete search history.

(56) References Cited

U.S. PATENT DOCUMENTS

| | | | |
|---|---|---|---|
| 5,790,341 A * | 8/1998 | Cunningham et al. | 360/76 |
| 6,275,360 B1 * | 8/2001 | Nakamoto et al. | 360/319 |
| 6,437,947 B1 * | 8/2002 | Uno | 360/78.04 |
| 6,687,084 B2 * | 2/2004 | Takahashi et al. | 360/125.13 |
| 6,795,277 B2 * | 9/2004 | Tsuchiya et al. | 360/317 |
| 6,914,756 B2 * | 7/2005 | Molstad et al. | 360/316 |
| 2005/0135007 A1 * | 6/2005 | Nishikawa et al. | 360/126 |

FOREIGN PATENT DOCUMENTS

| | | |
|---|---|---|
| JP | 2-66710 | 3/1990 |
| JP | 2-91806 | 3/1990 |
| JP | 7-287817 | 10/1995 |
| JP | 11-328632 | 11/1999 |
| JP | 11-353618 | 12/1999 |
| JP | 2001-250204 | 9/2001 |
| JP | 2002-197615 | 7/2002 |

* cited by examiner

*Primary Examiner* — Craig A. Renner
*Assistant Examiner* — Adam B Dravininkas
(74) *Attorney, Agent, or Firm* — Oblon, Spivak, McClelland, Maier & Neustadt, L.L.P.

(57) ABSTRACT

The invention provides a magnetic recording/reproducing system constructed such that until the skew angle is past the maximum skew angle $\alpha_{max}$, the edges of the write shield layer and the edges of the lower read shield layer do not overlap on the same track, so that upon application of an external magnetic field, the already written signals are kept back from degradation.

16 Claims, 15 Drawing Sheets

MAGNETIC RECORDING/REPRODUCING SYSTEM, AND THIN-FILM MAGNETIC HEAD HAVING SHIELD LAYERS OF SPECIFIED WIDTHS

BACKGROUND OF THE INVENTION

1. Field of the Invention

The present invention relates to a magnetic head comprising a magnetic pole layer capable of perpendicular recording, and a magnetic recording/reproducing system comprising that magnetic head, a recording medium, and a drive unit adapted to rotationally drive that recording medium in a constant direction and make that magnetic head movable in the radial direction of the recording medium.

2. Explanation of the Prior Art

In association with an increase in the areal recording densities of recording media such as a hard disk (hereinafter called simply the "recording medium"), there are now growing demands on improvements in the performance of a thin-film magnetic head mounted on a magnetic recording system such as a hard disk drive.

By the recording, for instance, such a thin-film magnetic head is broken down into a areal recording with the direction of a signal magnetic field aligned with the longitudinal direction of a recording medium and a perpendicular recording with the direction of a signal magnetic field in alignment with the direction orthogonal to the surface of a magnetic medium.

As of now, the areal recording is still prevailing; however, it will be superceded just about surely by the perpendicular recording in consideration of market trends toward increases in the areal recording densities of recording media. The perpendicular recording has the merit of an already recorded medium being less affected by thermal fluctuation, let alone the ability to make sure high recording densities.

Typically, the thin-film magnetic head of the perpendicular recording is built up of a thin-film coil adapted to generate a recording magnetic flux, and a main magnetic pole layer that extends rearward from the air bearing surface and is adapted to magnetize a recording medium on the basis of a recording magnetic flux generated at the thin-film coil. With such a thin-film head of the perpendicular recording, magnetic information is recorded on that recording medium, because the data tracks of the recording medium are magnetized under a perpendicular magnetic field generated at the main magnetic pole.

For the thin-film magnetic head of the perpendicular recording, there is a thin-film magnetic head known, which comprises a main magnetic pole layer located in such a way as to extend in a direction orthogonal to the air bearing surface, as noted above. Such a thin-film magnetic head of the perpendicular recording is generally called the "mono-pole type thin-film magnetic head".

There is a specific structure of this mono-pole type thin-film magnetic head known (from Patent Publications 1, 2, 3, 4, etc.), in which, for instance, an auxiliary magnetic pole layer for receiving an auxiliary magnetic flux is coupled to a main magnetic pole layer for the purpose of increasing the strength of a perpendicular magnetic field thereby improving the overwrite performance. With the mono-pole type thin-film magnetic head, however, there would be some limits to improvements in the overwrite performance, as noted above.

With a thin-film magnetic head of the perpendicular recording proposed recently in the art, therefore, a write shield layer for reducing the spread of a magnetic flux released off a main magnetic pole layer is used in combination with the main magnetic pole layer that extends in the direction orthogonal to the air bearing surface as mentioned above for the purpose of, for instance, keeping the recording track width back from growing wide and making a magnetic flux gradient steep, thereby enhancing the recording density of the recording medium.

Such a type of thin-film magnetic head of the perpendicular magnetic mode is generally referred to as the "shield type thin-film magnetic head". The write shield layer is spaced away from the main magnetic pole via a gap of up to 0.2 μm, and extends rearward from the air bearing surface, so that it is isolated from a main magnetic pole layer via a gap layer on a side near the air bearing surface and coupled to the main magnetic pole layer via a back gap on a side far away from the air bearing surface.

The shield type thin-film magnetic head comprising such a write shield layer makes sure improvements in the recording density of the recording medium, because the magnetic flux released off the main magnetic pole is so constricted that the gradient of the perpendicular magnetic field becomes steep.

And now, in order for the thin-film magnetic head of the perpendicular recording to have ever higher reliability, it must make sure stable magnetic operation regardless of whether it is of the shield type comprising the so-called shield or of the type comprising an auxiliary magnetic pole. With a conventional thin-film magnetic head, however, as there is an unwanted magnetic field (floating external magnetic field) generated from an external magnetic field-generation source such as a voice coil motor, it offers a problem that at a non-recording time, i.e., in a state with no recording current fed to the thin-film coil, unexpected writing (overwriting) takes place and information recorded on the recording medium is unintentionally erased off, although depending on the influences of that floating external magnetic field. Furthermore, recent rapid progresses of various media techniques render it impossible to factor out external magnetic fields other than those from the drives of magnetic recording/reproducing systems. Even in the state of the art, there is a growing risk of receiving external magnetic fields from music players (e.g., ipod (registered trade mark)) or hard disks mounted on cellular phones or the like.

With a perpendicular recording medium in particular, there is an unintentional writing problem, because due to the presence of a so-called lining layer located on the lower portion of a recording layer, an external magnetic field, if applied to it, causes a magnetic field to focus on the edge portion of the shield layer and then be absorbed in the lining layer. Providing a solution to that problem requires an all-out innovation with just only the structure of the magnetic head but also the whole magnetic recording/reproducing system taken into consideration.

The situation being like this, the present invention has for its object the provision of a magnetic recording/reproducing system and a thin-film magnetic head, in which the already written signals are kept back from degradation upon application of an external magnetic field.

SUMMARY OF THE INVENTION

According to the invention, such an object is achieved by the provision of a magnetic recording/reproducing system, comprising a thin-film magnetic head, a recording medium, and a drive unit adapted to rotationally drive said recording medium in a constant direction and capable of moving said thin-film magnetic head substantially in the radial direction of said recording medium, wherein:

said recording medium has data tracks adapted to record data information; said recording medium and said magnetic head are located in such a relation as to make a skew angle in the circumferential direction of at least some data tracks of said recording medium, wherein said skew angle has a maximum $\alpha_{max}$; said thin-film magnetic head comprises a recording head portion adapted to record magnetic information on said recording medium and a reproducing head portion adapted to reproduce the magnetic information recorded on said recording medium; said recording head portion comprises a thin-film coil adapted to generate a magnetic flux, a magnetic pole layer that extends rearward from its surface opposite to said recording medium to generate a magnetic field on the basis of the magnetic flux generated at said thin-film coil so that said recording medium is magnetized in the direction orthogonal to its surface, and a write shield layer that is located on a side of said magnetic pole layer in a direction of travel of said medium and extends rearward from said surface opposite to the recording medium, so that said write shield layer is isolated by a gap layer from said magnetic pole layer on a side near said surface opposite to the recording medium and coupled to said magnetic layer through a back gap on a side far away from said magnetic pole layer; said reproducing head portion comprises a magneto-resistive effect device, and an upper read shield layer and a lower read shield layer located below said upper read shield layer so as to magnetically shield off said device, wherein said upper read shield layer and said lower read shield layer extend rearward from the surface opposite to the recording medium; said write shield layer lies substantially at an air bearing surface that is said surface opposite to the recording medium; said upper read shield layer and said lower read shield layer lie substantially at the air bearing surface that is said surface opposite to the recording medium, wherein said lower read shield layer is spaced more away from said write shield layer than said upper read shield layer in a thickness direction; and both ends of said write shield layer at the air bearing surface in a width direction, both ends of said upper read shield layer at the air bearing surface in a width direction and both ends of said lower read shield layer at the air bearing surface in a width direction are positioned and set such that until said skew angle is past said maximum skew angle $\alpha_{max}$, both ends of said write shield layer at the air bearing surface in a width direction do not overlap either both ends of said upper read shield layer at the air bearing surface in a width direction or both ends of said lower read shield layer at the air bearing surface in a width direction, on the same track.

In a preferable embodiment of the magnetic recording/reproducing system of the invention, said write shield layer lies substantially at the air bearing surface that is the surface opposite to said recording medium, and has a width Wws at the air bearing surface; said upper read shield layer and said lower read shield layer lie substantially at the air bearing surface that is said surface opposite to the recording medium, wherein said lower read shield layer is spaced more away from said write shield layer than said upper read shield layer in a thickness direction, and said lower read shield layer has a width Wsf at the air bearing surface; and a rectangle drawn by connecting both ends across the width Wws of said write shield layer at the air bearing surface with both ends across the width Wsf of said lower read shield layer at the air bearing surface takes on a regular trapezoidal shape with two equal base angles, and is set in such a way as to satisfy:

$Wws < Wsf - 2X \cdot \tan \alpha_{max}$ when $Wws < Wsf$, and (i) condition $Wws > Wsf + 2X \cdot \tan \alpha_{max}$ when $Wws > Wsf$, (ii) condition where X is the maximum distance (corresponding to the trapezoid height) between said write shield layer and said lower read shield layer in a thickness direction.

In another preferable embodiment of the recording/reproducing system of the invention, said upper read shield layer has a width Wss at the air bearing surface, wherein Wss is set in such a way as to satisfy the following relation: $Wss \leqq Wsf$, where Wsf is the width of said lower read shield layer.

In yet another preferable embodiment of the recording/reproducing system of the invention, Wss is set in such a way as to satisfy the following relation: $Wss < Wsf$.

In a further preferable embodiment of the recording/reproducing system of the invention, said upper read shield layer is divided into two shield layers via a nonmagnetic layer in a thickness direction or said upper read shield layer has an upper first read shield layer and an upper second read shield layer from below; said upper first read shield layer has a width Wss1 at the air bearing surface, and said upper second read shield layer has a width Wss2 at the air bearing surface; and of said Wss1, said Wss2 and said Wsf, said Wsf is greatest.

In a further preferable embodiment of the recording/reproducing system of the invention, said upper read shield layer is divided into two shield layers via a nonmagnetic layer in a thickness direction or said upper read shield layer has an upper first read shield layer and an upper second read shield layer from below; said upper first read shield layer has a width Wss1 at the air bearing surface, and said upper second read shield layer has a width Wss2 at the air bearing surface; of said Wss1, said Wss2 and said Wsf, said Wss1 is greatest; and a rectangle drawn by connecting both ends across the width Wws of said write shield layer at the air bearing surface with both ends across the width Wss1 of said upper first read shield layer at the air bearing surface takes on a regular trapezoidal shape with two equal base angles, and is set in such a way as to satisfy:

$Wws < Wss1 - 2X1 \cdot \tan \alpha_{max}$ when $Wws < Wss1$, and (i) condition $Wws > Wss1 + 2X1 \cdot \tan \alpha_{max}$ when $Wws > Wss1$, (ii) condition where X1 is the maximum distance (corresponding to the trapezoid height) between said write shield layer and said upper first read shield layer in a thickness direction.

In a further preferable embodiment of the recording/reproducing system of the invention, said upper read shield layer is divided into two shield layers via a nonmagnetic layer in a thickness direction or said upper read shield layer has an upper first read shield layer and an upper second read shield layer from below; said upper first read shield layer has a width Wss1 at the air bearing surface, and said upper second read shield layer has a width Wss2 at the air bearing surface; of said Wss1, said Wss2 and said Wsf, said Wss2 is greatest; and a rectangle drawn by connecting both ends across the width Wws of said write shield layer at the air bearing surface with both ends across the width Wss2 of said upper second read shield layer at the air bearing surface takes on a regular trapezoidal shape with two equal base angles, and is set in such a way as to satisfy:

$Wws < Wss2 - 2X2 \cdot \tan \alpha_{max}$ when $Wws < Wss2$, and (i) condition $Wws > Wss2 + 2X2 \cdot \tan \alpha_{max}$ when $Wws > Wss2$, (ii) condition where X2 is the maximum distance (corresponding to the trapezoid height) between said write shield layer and said upper second read shield layer in a thickness direction.

In a further preferable embodiment of the recording/reproducing system of the invention, the data tracks of said recording medium are comprised of a perpendicular magnetic recording layer, which has an underlay soft magnetic layer for assisting a perpendicular magnetic flux.

In a further preferable embodiment of the recording/reproducing system of the invention, a recording magnetic field generated from the magnetic pole layer of said magnetic head passes perpendicularly through said perpendicular magnetic recording layer to make perpendicular magnetic records on said perpendicular magnetic recording layer.

In a further preferable embodiment of the recording/reproducing system of the invention, said magnetic pole layer comprises a main magnetic pole layer that extends rearward from a recording medium opposite surface opposite to the recording medium traveling in the direction of travel of the medium and is adapted to generate a magnetic field on the basis of the magnetic flux generated at said thin-film coil so that said recording medium is magnetized in the direction orthogonal to its surface, and an auxiliary magnetic pole layer that extends rearward from a first position receded from said magnetic recording opposite surface, wherein said main magnetic pole layer and said auxiliary magnetic pole layer are stacked one upon another.

In a further preferable embodiment of the recording/reproducing system of the invention, said write shield layer comprises a first magnetic shield portion that extends along said gap layer from said recording medium opposite surface to a second position in front of said first position, and a second magnetic shield layer portion that extends from said recording medium opposite surface to at least said back gap while going partially over said first magnetic shield portion.

The present invention also provides a thin-film magnetic head, comprising a recording head portion adapted to record magnetic information on a recording medium and a reproducing head portion adapted to reproduce the magnetic information recorded on said recording medium, wherein said recording head portion comprises a thin-film coil adapted to generate a magnetic flux, a magnetic pole layer that extends rearward from a surface opposite to said recording medium and is adapted to generate a magnetic field on the basis of the magnetic flux generated at said thin-film coil so that said recording medium is magnetized in the direction orthogonal to its surface, and a write shield layer that is located on a side of said magnetic pole layer in a direction of travel of said medium and extends rearward from said surface opposite to the recording medium, so that said write shield layer is isolated by a gap layer from said magnetic pole layer on a side near said surface opposite to the recording medium and coupled to said magnetic layer through a back gap on a side far away from said surface opposite to the recording medium; an end portion of said magnetic pole layer at an air bearing surface that is a surface opposite to said recording medium takes on an inverted trapezoidal shape in section at the air bearing surface wherein in consideration of relative movement to the recording medium, a short side is defined by a width W4 of a lower end edge positioned on a leading side, a long side is defined by a width W1 of an upper end edge on a trailing side (W4<W1), and a height is defined by a thickness direction, provided that a bevel angle β defined by side and thickness-direction lines of said inverted trapezoidal shape is set at the same angle as a maximum skew angle $\alpha_{max}$; said reproducing head portion comprises a magneto-resistive effect device, and an upper read shield layer and a lower read shield layer located below said upper read shield layer so as to magnetically shield off said device; said upper read shield layer and said lower read shield layer extend rearward from a recording medium opposite surface opposite to the recording medium; said write shield layer lies substantially at the air bearing surface that is the recording medium opposite surface opposite to the recording medium; said upper read shield layer and said lower read shield layer lie substantially at the air bearing surface that is the surface opposite to the recording medium, wherein said lower read shield layer is spaced more away from said write shield layer than said upper read shield layer in a thickness direction; and both ends of said write shield layer at the air bearing surface in a width direction, both ends of said upper read shield layer at the air bearing surface in a width direction and both ends of said lower read shield layer at the air bearing surface in a width direction are positioned and set such that until said skew angle is past said maximum skew angle $\alpha_{max}$, both ends of said write shield layer at the air bearing surface in a width direction do not overlap either both ends of said upper read shield layer at the air bearing surface in a width direction or both ends of said lower read shield layer at the air bearing surface in a width direction, on the same track.

In the magnetic recording/reproducing system of the invention set up as described above, the edges of said write shield layer and the edges of said lower read shield layer do not overlap on the same track until the skew angle is past the maximum skew angle $\alpha_{max}$. Thus, the invention has a very good advantage in that upon application of an external magnetic field, the already written signals are kept back from degradation.

DETAILED EXPLANATION OF THE INVENTION

The best mode for carrying out the invention is now explained in details.

The magnetic recording/reproducing system of the invention is built up of a thin-film magnetic head, a recording medium, and a drive unit adapted to rotationally drive the recording medium in a constant direction and capable of moving the magnetic head in substantially the radial direction of the recording medium.

First of all, for a better grasp of the whole construction of the system, an exemplary schematic construction of the magnetic recording/reproducing system is now explained with reference to FIGS. 4 and 5.

(Explanation of an Exemplary Construction of the Magnetic Recording/Reproducing System)

Figure 4:
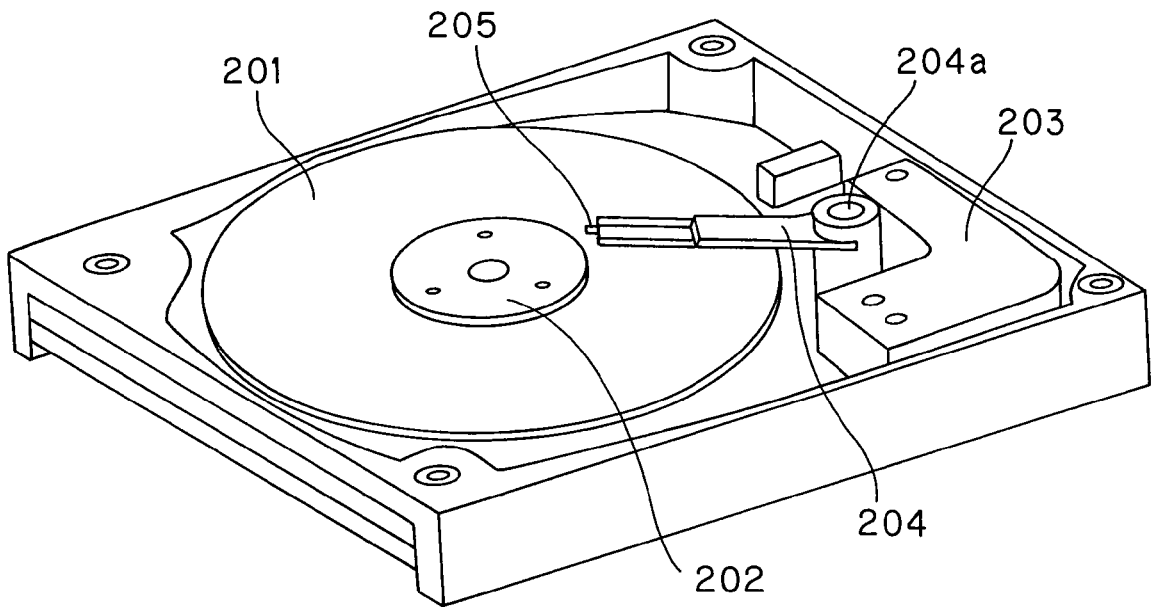
FIG. 4 is a schematic perspective view of the magnetic recording/reproducing system.
Figure 5:
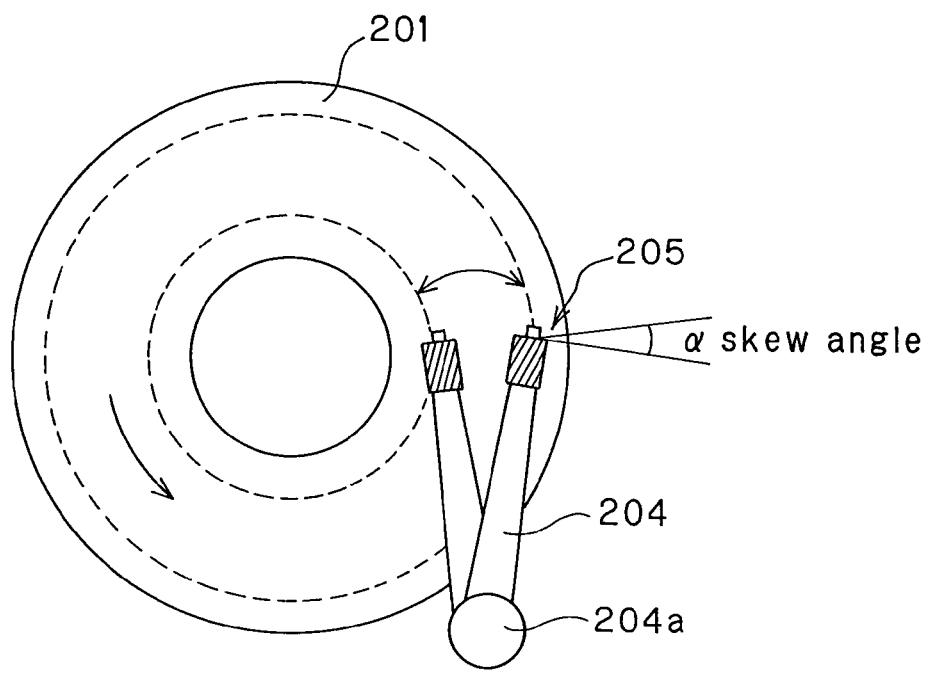
FIG. 5 is a schematic plan view of part of the magnetic recording/reproducing system.

FIG. 4 is a schematic perspective view of the magnetic recording/reproducing system that is one preferable embodiment of the invention. FIG. 5 is a plan view of part of FIG. 4. Referring now to FIG. 4, a disk form of perpendicular recording medium is used as a recording medium 201 adapted to be rotationally driven by a spindle motor 202.

To read or write data out of or on the recording medium 201, a rotating arm 204 that extends toward the center of the recording medium 201 from outside is provided at its free end with a recording/playback thin-film magnetic head 205.

The rotating arm 204 is adapted to be rotated by a voice coil motor 203 about a rotary actuator 204a so that the recording/reproducing thin-film magnetic head can be positioned at a given track on the basis of, for instance, servo signals detected by that magnetic head. A drive system comprising the spindle motor 202, voice coil motor 203, etc. is included in a drive unit.

The recording/reproducing thin-film magnetic head 205 comprises a recording head portion adapted to record magnetic information on the recording medium, and a reproducing head portion adapted to reproduce the magnetic information recorded on the recording medium, as will be described later.

Ideally, the recording head portion (and the reproducing head portion) of the thin-film magnetic head is supposed to implement recording operation (and reproducing operation) while it lies straight along the circumferential direction of data tracks without being off them. In actual applications, however, there is a skew angle $\alpha$ indicative of a misalignment of the magnetic head out of the reference plane orthogonal to the circumferential direction of data tracks, because the thin-film magnetic head 205 is mounted on the free end of the rotating arm 204 rotating about the rotary actuator 204a.

For instance, as the skew angle $\alpha$ that is an angle with the plane orthogonal to the circumferential direction of a specific data track is set at zero, there is a skew angle $\alpha$ always occurring at other data tracks. Alternatively, as there is a skew angle $\alpha$ of 0 at the innermost data track of a disk-like recording medium, there will be the maximum skew angle $\alpha_{max}$ occurring at the outermost data track of the disk-like recording medium.

(Explanation of the Recording Medium)

Then, the construction of the recording medium is explained.

A disk form of recording medium 201 usually comprises a data information recording portion that is a group of data tracks for recording and reproducing purposes, and a servo information portion that is an area with serve signals recorded on it. At the data information recording portion, there are data tracks located concentrically or spirally, and at the servo information portion there are a plurality of servo tracks located as predetermined.

The structure of the recording medium at a site the data tracks formed on it, for instance, is comprised of a substrate, a soft magnetic layer (the so-called lining layer) formed on that substrate, and a perpendicular magnetic recording layer.

For the substrate, preference is given to a glass substrate, an aluminum alloy substrate coated with NiP, an Si substrate or the like; for the soft magnetic layer, preference is given to a CoZrNb alloy layer, an Fe base alloy layer, a Co base amorphous alloy layer, a soft magnetic/nonmagnetic multilayer, a soft magnetic ferrite layer or the like; and for the perpendicular magnetic recording layer (data tracks), a medium having CoPt or other ferromagnetic particles contained in an oxide material of $SiO_2$ in a matrix form, a CoCr base alloy, an FePt alloy, a Co/Pd base artificial lattice type multilayer alloy or the like. For an orientation layer formed underneath the soft magnetic layer, for instance, use may be made of a PtMn or other antiferromagnetic material for imparting a magnetically anisotropic magnetic field in the track width direction of the soft magnetic layer, or a nonmagnetic alloy for orientation control.

It is also preferable that an intermediate layer for control of the perpendicular magnetic anisotropy and crystal grain diameter of the perpendicular magnetic recording layer is interposed between the soft magnetic layer and the perpendicular magnetic recording layer. Typically, the material for the intermediate layer may be exemplified by Ru or CoTi nonmagnetic alloys, nonmagnetic metals or alloys having similar actions, or alloys having low permeability. On the perpendicular magnetic recording layer, usually, there is a protective layer formed, which is made of a carbon thin film or the like.

[Explanation of One Exemplary Whole Construction of the Thin-Film Magnetic Head]

One exemplary whole construction of the thin-film magnetic head is now explained with reference to FIGS. 1, 2 and 3.

Figure 1:
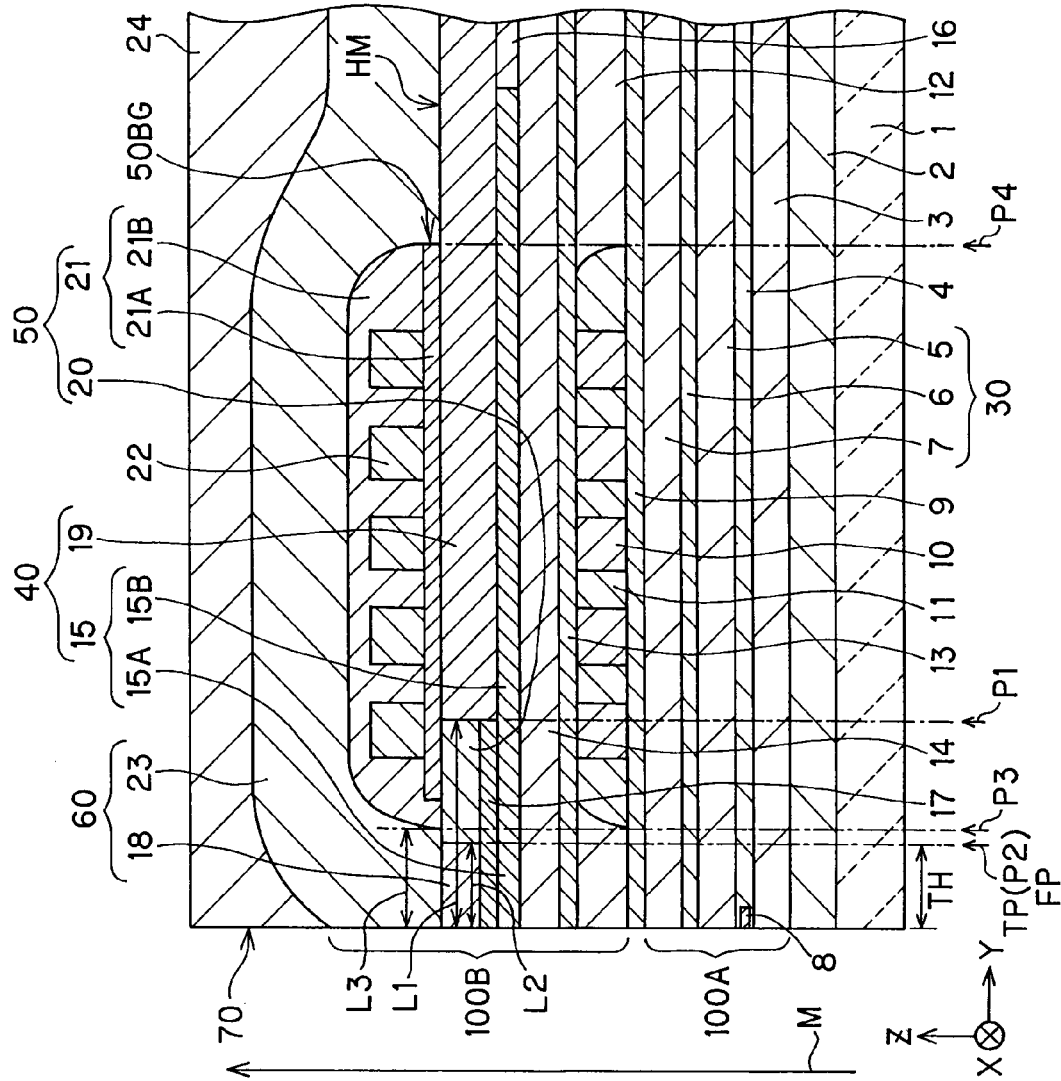
FIG. 1A is a sectional view of the construction of the thin-film magnetic head parallel with the air bearing surface.
FIG. 1B is a sectional view of the thin-film magnetic head perpendicular to the air bearing surface.

FIG. 1 is illustrative in section of the whole construction of the thin-film magnetic head: FIG. 1A is a sectional view of the construction of the thin-film magnetic head parallel with the air bearing surface (as taken along the X-Z plane), and FIG. 1B is a sectional view of the thin-film magnetic head perpendicular to the air bearing surface (as taken along the Y-Z plane). FIG. 2 is a plan view of the construction of part of the magnetic head (as viewed from the Z-axis direction), and FIG. 3 is a plan view of the construction of part of the magnetic head (as viewed from the Y-axis direction), with an exposed surface of the part drawn on an enlarged scale. It is noted that the upward arrow M given in FIG. 1 is indicative of the direction (medium travel direction) of relative movement of a recording medium (not shown) with respect to the thin-film magnetic head.

Certain terminology may be used in the following description for convenience in reference only. For instance, the word "width" would refer to a dimension in the X-axis direction shown in FIGS. 1, 2 and 3, the "length" to a dimension in the Y-axis direction, and the "thickness" to a dimension in the Z-axis direction. Similarly, the word "front" would refer to a side nearer to the air bearing surface, and the "rear" to the opposite side (depth side).

The thin-film magnetic head is used on a magnetic recording system such as a hard disk drive for the purpose of applying magnetic processing to a recording medium moving in the medium travel direction M, for instance, a hard disk, as noted above.

For instance, the thin-film magnetic head illustrated in the drawings is a composite type head capable of implementing both recording and reproducing as magnetic processing. The structure comprises, as shown in FIG. 1, a substrate 1 made of a ceramic material such as AlTiC ($Al_2O_3$.TiC), and an insulating layer 2 made of a nonmagnetic insulating material such as aluminum oxide ($Al_2O_3$; hereinafter referred simply as alumina), a reproducing head portion 100A adapted to reproduce magnetic information recorded by harnessing the magneto-resistive (MR) effect, a separation layer 9 made of a nonmagnetic insulating material such as alumina, a shield type recording head portion 100B adapted to implement a perpendicular recording of recording processing, and an overcoat layer 24 made of a nonmagnetic insulating material such as alumina, all stacked one upon another on the substrate 1 in that order.

For instance, the reproducing head portion 100A has a multilayer structure comprising a lower read shield layer 3, a shield gap film 4 and an upper read shield layer 30 stacked one upon another in that order. In the shield gap film 4, there is a magneto-resistive effect device (MR device) 8 embedded as a reproducing device in such a way that its one end face is exposed on the recording medium opposite plane (air bearing surface) 70 opposed to the recording medium.

Both the lower 3 and the upper read shield layer 30 are provided to separate the MR device magnetically from the surroundings, extending rearward from the air bearing surface 70. The lower read shield layer 3 is made of a soft magnetic material such as permalloy (Ni(80 wt %)Fe(20 wt %)) that is a nickel-iron alloy, and has a thickness of about 1.0 to 2.0 μm.

In the embodiment here, the upper read shield layer 30 is divided in two shield layers 5 and 7 via a non-magnetic layer 6 in a thickness direction. In other words, that upper read shield layer 30 has a structure where the upper first read shield layer 5, the nonmagnetic layer 6 and the upper second read shield layer 7 are stacked one upon another in order from its side near to the shield gap film 4.

The upper first read shield layer 5 is made of a magnetic material such as permalloy, and has a thickness of typically about 1.5 μm. The upper second read shield layer 7 is made of a magnetic material such as permalloy, too, and has a thickness of typically about 1.1 μm. The nonmagnetic layer 6 is made of a nonmagnetic material such as ruthenium (Ru) or alumina, and has a thickness of typically about 0.2 μm.

While it is shown and described that the upper read shield layer 30 has a multilayer structure, it is contemplated that it is not always required to have a multilayer structure; it could have a single-layer structure as is the case with the lower read shield layer 3.

The shield gap film 4 is provided to separate the MR device 8 electrically from the surroundings; for instance, it is made of a nonmagnetic material such as alumina.

The MR device operates in such a way as to implement reproducing processing by making use of typically the giant magneto-resistive (GMR) effect. Instead of the GMR device, a CPP-GMR device or a TMR (tunneling magneto-resistive effect) device may just as well be used.

The recording head portion 100B, for instance, has a multilayer structure comprising a first-stage thin-film coil 10 buried around with insulating layers 11, 12, 13, a nonmagnetic layer 14, a magnetic pole layer 40 partially buried around with an insulating layer 16, a gap layer 17, a second-stage thin-film coil 22 buried with an insulating layer 50 that forms a magnetic coupling opening (back gap 50 BG) and a write shield layer 60, all stacked one upon another in order.

Figure 2:
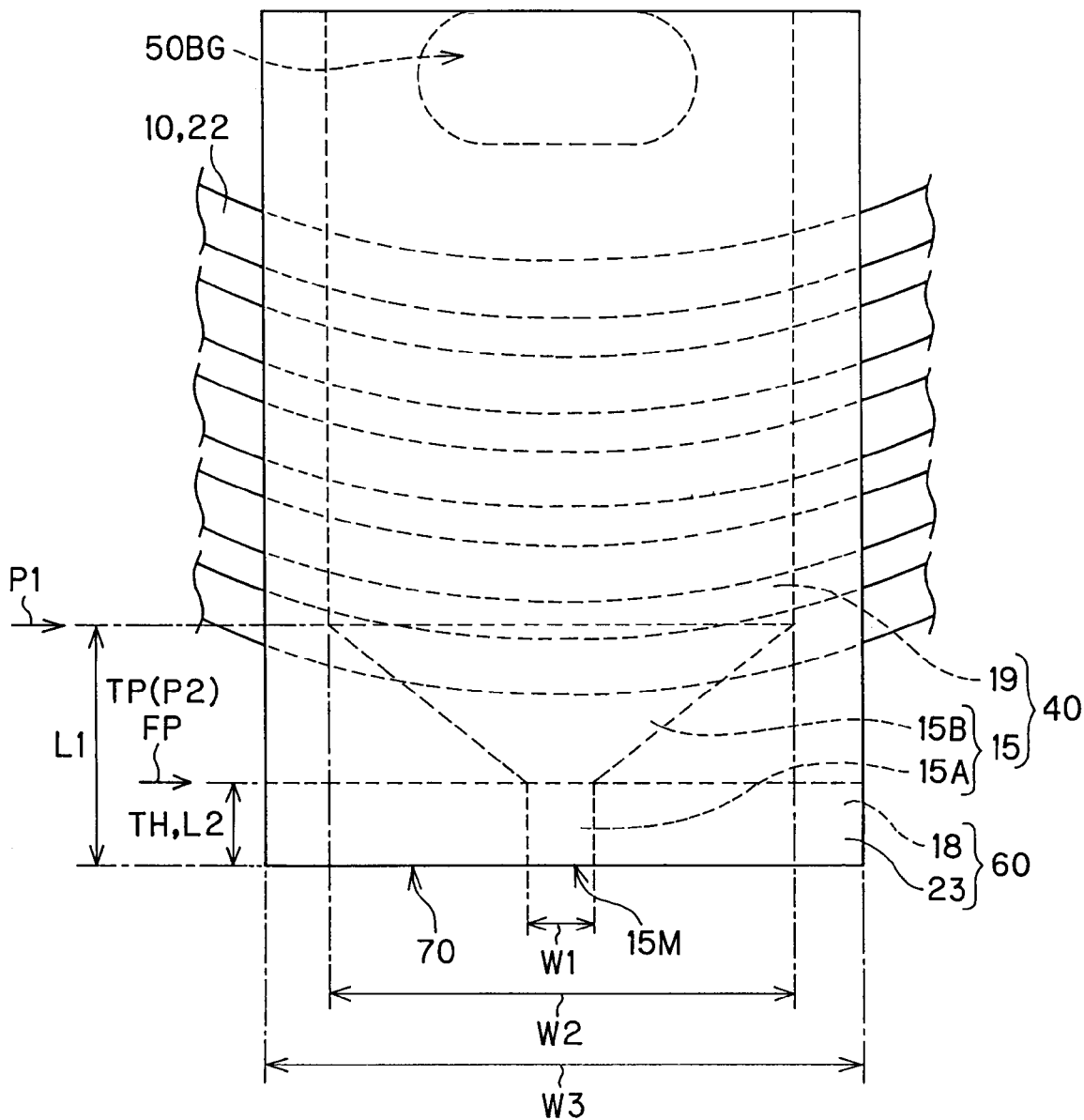
FIG. 2 is illustrative in plane of the construction of part of the thin-film magnetic head shown in FIGS. 1A and 1B.

In FIG. 2, only a main part (thin-film coils 10, 22, magnetic pole layer 40 and write shield layer 60) extracted out of the recording head portion 100B is primarily shown.

The thin-film coil 10 has a primary function of generating a leakage-preventive magnetic flux for holding back leakage of a recording magnetic flux produced at the thin-film coil 22. This thin-film coil 10 is made of a highly electroconductive material such as copper, and has a thickness of typically about 2.0 μm.

As shown typically in FIGS. 1 and 2, the thin-film coil 10 in particular has a spiral structure having turns about the back gap 50BG. The thin-film coil 10 typically operates such that currents flow in a direction opposite to the direction taken by currents flowing through the thin-film 22. While it is shown in FIGS. 1 and 2 that the thin-film coil 10 has five turns by way of illustration alone, it is contemplated that the number of turns could optionally be varied. Preferably, the thin-film coil 10 should have as many turns as the thin-film coil 22, for instance, 2 to 7 turns. The thin-film coil 10 may just as well be used in a helical coil form.

The insulating layers 11, 12, 13 are formed in such a way as to separate the thin-film coil 10 electrically from the surroundings. The insulating layer 11 is formed in such a way as to be filled up between the turns of the thin-film coil 10 and provide a cover around the thin-film coil 10. This insulating layer 11 is made of a non-magnetic insulating material such as a photoresist (photosensitive resin) or spin-on-glass (SOG) exhibiting fluidity upon heating, and has a thickness of typically about 2.0 μm.

In the embodiment here, the insulating layer 11 is formed in such a way as to cover only the sides of the thin-film coil 10 but provide no cover to the upper side of the thin-film coil 10, as shown in FIG. 1.

The insulating layer 12 is formed in such a way as to provide a cover around the insulating layer 11. This insulating layer 12 is made of a nonmagnetic material such as alumina, and has a thickness of typically about 2.0 µm.

The insulating layer 13 is formed in such a way as to give a cover to the thin-film coil 10 as well as the insulating layers 11, 12. This insulating layer 13 is made of a nonmagnetic material such as alumina, and has a thickness of typically about 0.2 µm.

The nonmagnetic layer 14 is formed of a nonmagnetic insulating material such as alumina, or a nonmagnetic electroconductive material such as ruthenium, and has a thickness of typically about 1.0 µm.

The magnetic pole layer 40 has a primary function of implementing recording processing by receiving a magnetic recording magnetic flux produced at the thin-film coil 22 and releasing that magnetic flux toward the recording medium. More specifically, it produces a magnetic field (perpendicular magnetic field) for magnetizing the recording medium in a direction orthogonal to its surface on the basis of a recording magnetic flux for the perpendicular recording of recording processing.

Such magnetic pole layer 40 is located on the leading side of the thin-film coil, extending rearward from the air bearing surface 70, more specifically, as far as the back gap 50 BG. It is noted that when the state of movement of the recording medium that moves toward the medium travel direction M shown in FIG. 1 is viewed as a sort of flow, the aforesaid "leading side" would refer to the incoming side (opposite to the medium travel direction M side) of that flow that is here corresponding to the upstream side in the thickness (Z-axis) direction. On the other hand, the outgoing side of the flow (the medium travel direction M side) would be called the "trailing side" that is here corresponding to the downstream side in the thickness direction.

In the embodiment here, the magnetic pole layer 40 has a structure where, as shown in FIG. 1, a main magnetic pole layer 15 and an auxiliary magnetic pole layer 19 are stacked one upon another in order and thereby coupled to each other. In other words, it has a multilayer (double-layer) structure where the main magnetic pole layer 15 is located on the leading side and the auxiliary magnetic pole layer 19 is located on the trailing side.

The main magnetic pole layer 15 functions as a portion for releasing off a main writing magnetic flux. This main magnetic pole layer 15 extends rearward from the air bearing surface 70 on the leading side, more specifically, as far as the back gap 50 BG, and has a thickness of typically about 0.25 µm. Such main magnetic pole layer 15, for instance, is made of a magnetic material that is higher in saturation flux density than the magnetic material of which the auxiliary magnetic pole layer 19 is made, specifically, an iron alloy or the like. The iron alloy here, for instance, includes an iron-nickel alloy (FeNi), an iron-cobalt alloy (FeCo) or an iron-cobalt-nickel alloy (FeCoNi), all rich in iron (Fe).

It is noted that the aforesaid "coupled" would mean just only a coupling involving physical contact but also a coupling involving physical contact plus a magnetically conductive coupling.

As shown in FIG. 2, the main magnetic pole layer 15 is configured in a generally battledore type planar shape. To be more specific, the main magnetic pole layer 15 comprises, in order from the air bearing surface 70, a front end 15A that extends rearward from that air bearing surface 70 and having a constant width W1 for defining the recording track width of the recording medium and a rear end 15B that is coupled to the rear of that front end 15A and having a width W2 greater than the width W1 (W2>W1). The position at which the width of the main magnetic pole layer 15 starts growing wide from the front end 15A (of width W1) toward the rear end 15B (of width W2) is a "flare point FP" that is one of important determinants for the recording performance of the thin-film head.

The front end 15A is primarily adapted to substantially release a recording magnetic flux produced at the thin-film coil 22 toward the recording medium, and has an exposed surface 15M exposed on the air bearing surface 70, as shown in FIG. 2. As shown typically in FIG. 3, the exposed surface 15M takes a planar shape defined by an upper end edge (one end edge) E1 positioned on the trailing side, a lower end edge (another end edge) E2 positioned on the leading side, and two side end edges (corresponding to the side of a trapezoid). To be more specific, the exposed surface 15M typically assumes on a trapezoidal shape with its width becoming gradually narrow from the trailing side toward the leading side (W1>W4). And, as shown in FIG. 3, a bevel angle β defined by the side line and thickness-direction line of an inverted trapezoidal shape in section should be the same as the maximum skew angle $\alpha_{max}$ at which a magnetic recording/reproducing system is to be operated.

The trailing edge TE of the front end 15A is a substantial recording site of the magnetic pole layer 40. Regarding the planar shape of the exposed surface 15M, it is noted that an angle θ between the extending direction of the lower edge end E2 and the side edge ends E3 has a relation: β=90−θ in view of the bevel angle β.

The rear end 15B shown in FIG. 2 is adapted to receive the magnetic flux received in the auxiliary magnetic pole layer 19 and feed it to the front end 15A. Typically, the width of this rear end 15B remains constant (width W2) in the rear, and becomes gradually narrow from width W2 to width W1 in the front as the front end 15A comes near.

The auxiliary magnetic pole layer 19 functions as a portion adapted to receive a dominant magnetic flux. Typically, this auxiliary magnetic pole layer 19 extends rearward from a position P1 (the first position) receded from the air bearing surface 70. To be more specific, it extends as far as the rear of the main magnetic pole layer 15 at the back gap 50BG, and has a thickness of typically about 0.45 µm. In particular, the auxiliary magnetic pole layer 19 is made of a magnetic material lower in saturation flux density than the magnetic material of which the main magnetic pole layer 15 is made. A preferable example is an iron-cobalt-nickel alloy.

As shown typically in FIG. 2, the auxiliary magnetic pole layer 19 has a rectangular planar shape of width W2, as shown in FIG. 2. In the auxiliary magnetic pole layer 19 in particular, both an auxiliary insulating layer 20 of the insulating layer 50 to be described later and a TH defining layer 18 of the write shield layer 60 to be described later are flattened. That is, the end face of the auxiliary magnetic pole layer 19 on the trailing side forms a flat plane HM together with the end face of the auxiliary insulating layer 20 on the trailing side and the end face of the TH defining layer 18 on the trailing side.

The insulating layer 16 is provided to isolate the main magnetic pole layer 15 electrically from the surroundings. This insulating layer 16 is made of a nonmagnetic insulating material such as alumina, and has a thickness of typically about 0.25 µm.

The gap layer 17 is formed in such a way as to provide a gap for the magnetic separation of the magnetic pole layer 40 from the write shield layer 60. As typically shown in FIG. 1, the gap layer 17 extends rearward from the air bearing surface 70 along the main magnetic pole layer 15 except an area with the auxiliary magnetic pole layer 19 located on it. In particular, the gap layer 17 is made of a nonmagnetic insulating material such as alumina or a nonmagnetic electroconductive material such as ruthenium, and has a thickness of typically about 0.03 to 0.1.

The insulating layer 50 defines the throat height TH that is one of important determinants for the recording performance of the thin-film magnetic head, and is adapted to cover the thin-film coil 22 in such a way as to isolate it electrically from the surroundings. As shown in FIG. 1, the insulating layer 50 has a structure where an auxiliary insulating layer 20 (the first insulating layer portion) formed in such a way as to substantially define the throat height TH and a main insulating layer 21 (the second insulating layer portion) formed in such a way as to substantially cover the thin-film coil 22 are stacked one upon another in that order. It follows that there is a multilayer (double-layer) structure involved, wherein the auxiliary insulating layer 20 is located on the leading side and the main insulating layer 21 is located on the trailing side.

As shown in FIG. 1, the auxiliary insulating layer 20 extends along the gap layer 17 and from a position receded from the air bearing surface 70, viz., a position P2 (the second position) between the air bearing surface 70 and position P1 to the position P1 in the rear. And, the auxiliary insulating layer 20 is provided in such a way as to be adjacent to the auxiliary magnetic pole layer 19 at the position P1, and adjacent to the write shield layer 60 (the TH defining layer 18 to be described later) at the position P2. In the embodiment here in particular, the auxiliary insulating layer 20 defines a flat plane HM together with the auxiliary magnetic pole layer 19 and TH defining layer 18.

The aforesaid "position P2" is corresponding to the foremost end position of the insulating layer 50 (nearest to the air bearing surface 70). That is, there is a "zero throat height position TP" for defining the throat height TH. That throat height TH is a distance between the air bearing surface 70 and the zero throat height position TP. This auxiliary insulating layer 20 is made of a nonmagnetic insulating material such as alumina. In the embodiment shown in FIGS. 1 and 2, the zero throat height position TP is in coincidence with the flare point FP.

As shown in FIG. 1, the main insulating layer 21 extends rearward from a position P3 (the third position) between the positions P1 and P2 while lying along the flat plane HM of the auxiliary insulating layer 20. More specifically, the main insulating layer 21 extends in such a way as not to fill up the back gap 50BG, and is receded from the auxiliary insulating layer 20. As shown typically in FIG. 1, this main insulating layer 21 comprises a main insulating layer portion 21A that is located as an underlay of the thin-film coil 22 on the flat plane HM of the auxiliary insulating layer 20, and a main insulating layer portion 21B that is located in such a way as to cover the thin-film coil 22 and the main insulating layer portion 21A around it.

The main insulating layer portion 21A is made of a nonmagnetic material such as alumina, and has a thickness of typically about 0.2 µm.

The main insulating layer portion 21B is made of a nonmagnetic insulating material such as photoresist or spin-on-glass (SOG) that exhibits fluidity upon heating. A portion of this main insulating layer portion 21B at and near its end edge is in such a rounded slant shape as to fall away toward that end edge.

The thin-film coil 22 is formed for the generation of a recording magnetic flux. For instance, the thin-film coil 22 operates such that currents flow in the direction opposite to the direction taken by currents through the aforesaid thin-film coil 10.

The write shield layer 60 works capturing the spreading component of a recording magnetic flux released off the main magnetic pole layer 40, thereby holding back the spreading of that magnetic flux. Located on the trailing side of the magnetic pole layer 40 and thin-film coil 22, the write shield layer 60 extends rearward from the air bearing surface 70, whereby it is spaced by the gap film 17 away from the magnetic pole layer 20 on its side near to the air bearing surface 70, and coupled to the magnetic layer 40 through the back gap 50BG in its side far away from the air bearing surface 70.

The write shield layer 60 here comprises the TH defining layer 18 (the first magnetic shield layer portion) and a yoke layer 23 (the second magnetic shield layer portion) that are separate from each other, and has a structure wherein the TH defining layer 18 and yoke layer 23 are coupled to each other. It is here noted that the write shield layer 60 is not limited to the couple structure as shown; it may be an integral structure.

The TH defining layer 18 functions as a dominant magnetic flux inlet port adapted to capture an extra portion of the magnetic flux released directly from the magnetic pole. As shown typically in FIG. 1, this TH defining layer 18 extends from the air bearing surface 70 as far as a position in the rear, more specifically, as far as the position P2 in front of the position P1 while lying adjacent to the gap layer 17, so that at that position P2 it lies adjacent to the auxiliary insulating layer 20 of the insulating layer 50.

The TH defining layer 18 is made of a magnetic material having a high saturation flux density such as permalloy or an iron-base alloy, and assumes on a rectangular planar shape having a width W3 greater than the width W2 of the magnetic pole layer 40 (W3>W2), as shown in FIG. 2. In particular, the TH defining layer 18 forms the flat plane HM together with the auxiliary magnetic pole layer 19 and auxiliary insulating layer 20, as typically described above. In other words, the end face of the TH defining layer 18 on the trailing side forms the flat plane HM together with both the end face of the auxiliary magnetic pole layer 19 on the trailing side and the end face of the auxiliary insulating layer 20 on the trailing side. The TH defining layer 18 lies adjacent to the auxiliary insulating layer 20 at the position P2 as described above; that is, the TH defining layer 18 takes a substantial role of defining the foremost end position of the insulating layer 50 (the zero throat height position TP), thereby defining the throat height TH.

The yoke layer 23 is set up in such a way as to function as a passage for the magnetic flux captured out of the TH defining layer 18. Plus, it is constructed in such a way as to function as a return yoke through which the magnetic flux goes back from the lining layer of the medium. As shown typically in FIG. 1, the yoke layer 23 goes over the TH defining layer 18, extending at least as far as the back gap 50BG from the air bearing surface 70 via on the insulating layer 50. In other words, in the front, there is the yoke layer 23 going over the TH defining layer 18 and coupled to it, and in the rear, there is the yoke layer 23 lying adjacent to the main magnetic pole layer 40 through the back gap 50BG and coupled to it.

In the embodiment here, for instance, the yoke layer 23 extends as far as the rear of the back gap 50BG while coupled to the magnetic pole layer 40 at the back gap 50BG. Such yoke layer 23, for instance, is made of a magnetic material similar to that of which the TH defining layer 18 is made, and takes a rectangular planar shape having a width W3 as shown in FIG. 2.

Preferably for the thin-film magnetic head as described above, a constant dimension defined on the basis of a specific component is optimized to make sure recording performance, as shown typically in FIG. 1. To be more specific, it is desired that the distance of the auxiliary magnetic pole 19 receded from the air bearing surface 70, viz., a distance L1 between the air bearing surface 70 and the position P1 be 0.8 to 7.1 μm. The distance of the main insulating layer 21 receded from the air bearing surface 70, viz., a distance L3 between the air bearing surface 70 and the position P3 is greater than the length of the TH defining layer 18, viz., a distance L2 between the air bearing surface 70 and the position P2 (L3>L2). In consideration of the structural relation where the distance L3 is greater than the distance L2, the write shield layer 60 is designed such that the length of a portion of the yoke layer 23 adjacent to the TH defining layer 18 (viz., the distance L3) is greater than the length of the TH defining layer (viz., the distance L2). In other words, when the magnetic flux is captured in the yoke layer 23 of the write shield layer 60 via the TH defining layer 18, the magnetic path taken by that magnetic flux flowing through the write shield layer 60 is incrementally expanded.

It is here understood that the whole structure of the thin-film magnetic head as described above is disclosed by way of example alone; it could be modified in various ways.

Structural part of the invention—to be claimed in this application—of the preferable whole structure of the thin-film magnetic head as described above is now explained in greater detail.

[Explanation of the Write Shield Layer 60—Part of the Invention]

Part of the invention relating to a thin-film magnetic head comprising a magnetic head portion adapted to record magnetic information on a recording medium, and a reproducing head portion adapted to reproduce the magnetic information recorded on the recording medium is that relations between the width of a write shield layer that is coupled to a magnetic pole layer to constitute part of the recording head portion and the widths of an upper read shield layer and a lower read shield layer located below it so as to magnetically shield off a magneto-resistive effect device at the reproducing head portion are set such that, when there is an external magnetic field applied, the already written signals are kept back from degradation, with the maximum skew angle $\alpha_{max}$ factored in. To come right to the point, those relations are predetermined such that the edge of the write shield layer and the edges of the upper and lower read shield layers do not overlap on the same track until the skew angle is past the maximum skew angle $\alpha_{max}$.

The invention is now explained with reference to the embodiments shown in FIGS. 6 through 15, respectively.

FIGS. 6 through 15 are views of the structure of part of the thin-film magnetic head, as viewed from the air bearing surface (as is the case with FIG. 1(A)). Illustrated in these drawings are the write shield layer that is part of the invention, a substantial upper read shield layer, a lower read shield layer, a main magnetic pole layer 15, and an MR device 8. It is here noted that the direction of relative travel of the recording medium (not shown) with respect to the thin-film magnetic head is the bottom-to-top direction of the paper (see an arrow M in FIG. 1(A)), and that the leading side refers to the lower side of each layer shown in the drawings and the trailing side refers to the upper side.

Figure 6:
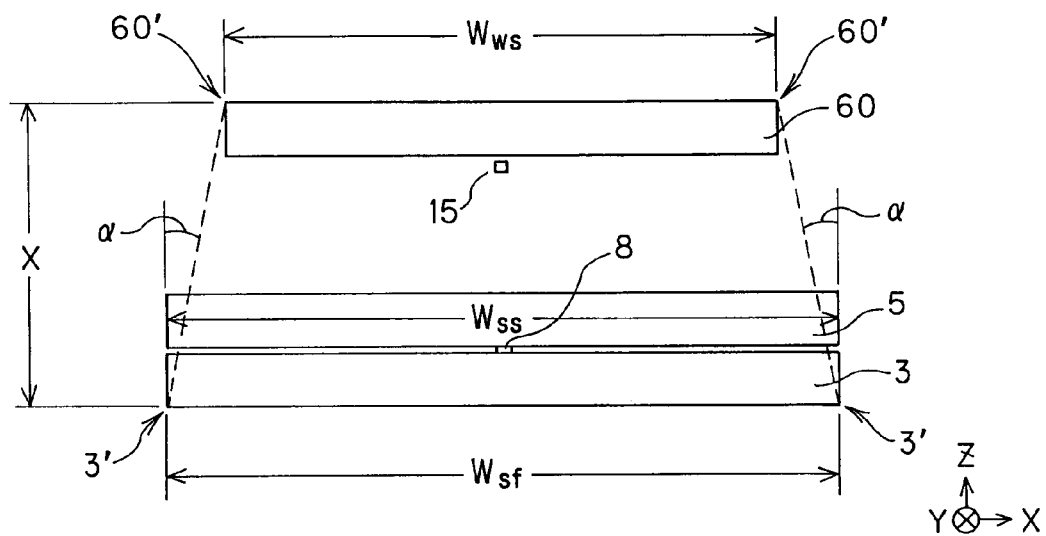
FIG. 6 is illustrative of the structure of part of the thin-film magnetic head (the first embodiment), as viewed from the air bearing surface.

(1) First Embodiment (Corresponding to FIG. 6)

Below the upper read shield layer 5 for magnetically shielding off the magneto-resistive device (MR device 8) at the reproducing head portion (tantamount to the upper first read shield layer 5 in FIG. 1), there is the lower read shield layer 3 located. Out of the embodiment here, the nonmagnetic layer 6 and upper second shield layer 7 in FIGS. 1(A) and 1(B) are left. In other words, the upper read shield layer 30 in FIG. 1 is simply made up of the upper first read shield layer 5.

As can be seen from FIG. 1 or FIG. 6, the lower read shield layer 3 is spaced more away from the write shield layer 60 than the upper read shield layer 5, as viewed in the thickness direction, and these shield layers 5, 7, 60 lie substantially on the air bearing surface that is opposed to the recording medium. The "lying substantially on the air bearing surface" is also an expression including even the air bearing surface having a protective film or the like formed by coating on it.

In the first embodiment, there is the relation: Wws<Wsf=Wss as shown in FIG. 6, where Wws is the width of the write shield layer 60, Wsf is the width of the lower read shield layer 3, and Wss is the width of the upper read shield layer 5.

And then, a rectangle drawn by connecting both ends 60', 60' across the width Wws of the write shield layer 60 shown in FIG. 6 with both ends 3', 3' across the width Wsf of the lower read shield layer 3 takes on a regular trapezoidal shape with two equal base angles. Here let X stand for the maximum distance (corresponding to the height of the trapezoid) between the write shield layer 60 and the lower read shield layer 3 in the thickness direction. Then, the width Wws of the write shield layer 6 and the width Wsf of the lower read shield layer 3 are set in such a way as to satisfy the following condition with the maximum skew angle $\alpha_{max}$ factored in:

$$Wws < Wsf - 2X \cdot \tan \alpha_{max}$$

By satisfaction of that condition, it is unlikely that both ends 60', 60' across the width Wws of the write shield layer 60 and both ends 3', 3' across the width Wsf of the lower read shield layer 3 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 3', 3' across the width Wsf of the lower read shield layer 3 refer to the edges of the lower read shield layer 3 on the leading side in the thickness direction, as shown.

Why weight is given to such specific edges in the invention resides on the inventors' findings that when there is an external magnetic field applied to the first embodiment of FIG. 6 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

In FIG. 6, Wws<Wsf=Wss; however, these relations may just as well be Wws<Wss<Wsf, or Wws<Wsf<Wss.

Figure 3:
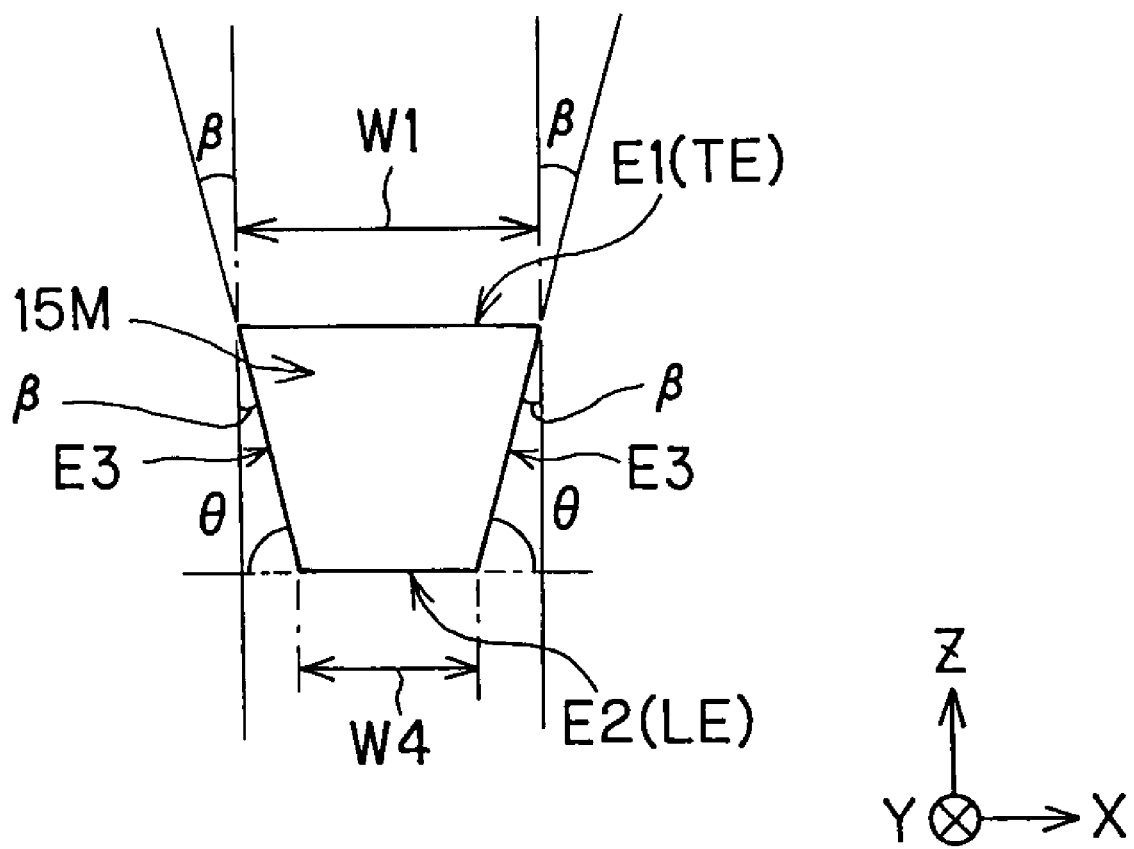
FIG. 3 is an enlarged plan view of the construction of an exposed plane of part of the thin-film magnetic head shown in FIGS. 1A and 1B.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid lower read shield layer on the air bearing surface in the width direction do not overlap on the same track until the skew angle is past the maximum skew angle $\alpha_{max}$.

Figure 7:
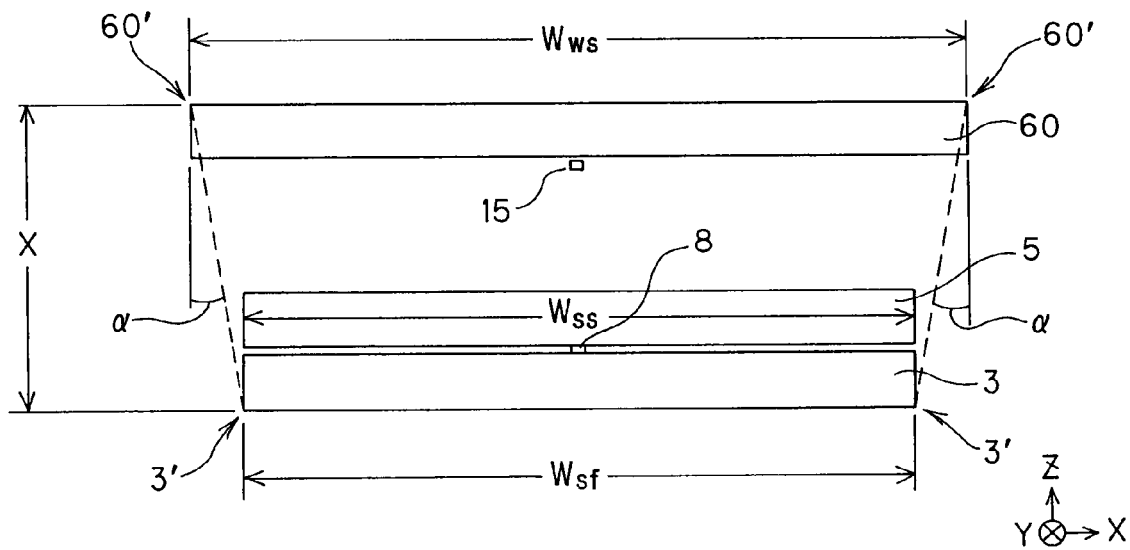
FIG. 7 is illustrative of the structure of part of the thin-film magnetic head (the second embodiment), as viewed from the air bearing surface.

(2) Second Embodiment (Corresponding to FIG. 7)

In the second embodiment, there is the relation: Wws>Wsf=Wss as shown in FIG. 7, where Wws is the width of the write shield layer 60, Wsf is the width of the lower read shield layer 3, and Wss is the width of the upper read shield layer 5.

And then, a rectangle drawn by connecting both ends 60', 60' across the width Wws of the write shield layer 60 shown in FIG. 7 with both ends 3', 3' across the width Wsf of the lower read shield layer 3 takes on a regular trapezoidal shape with two equal base angles. Here let X stand for the maximum distance (corresponding to the height of the trapezoid) between the write shield layer 60 and the lower read shield layer 3 in the thickness direction. Then, the width Wws of the write shield layer 60 and the width Wsf of the lower read shield layer 3 are set in such a way as to satisfy the following condition with the maximum skew angle $\alpha_{max}$ factored in:

$$Wws > Wsf + 2X \cdot \tan \alpha_{max}$$

By satisfaction of that condition, it is unlikely that both ends 60', 60' across the width Wws of the write shield layer 60 and both ends 3', 3' across the width Wsf of the lower read shield layer 3 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 3', 3' across the width Wsf of the lower read shield layer 3 refer to the edges of the lower read shield layer 3 on the leading side in the thickness direction, as shown. Why weight is given to such specific edges in the invention resides on the inventors' findings that when there is an external magnetic field applied to the second embodiment of FIG. 7 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

In FIG. 7, Wws>Wsf=Wss; however, these relations may just as well be Wws>Wss>Wsf, or Wws>Wsf>Wss.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid lower read shield layer on the air bearing surface in the width direction do not overlap on the same track until the skew angle is past the maximum skew angle $\alpha_{max}$.

Figure 8:
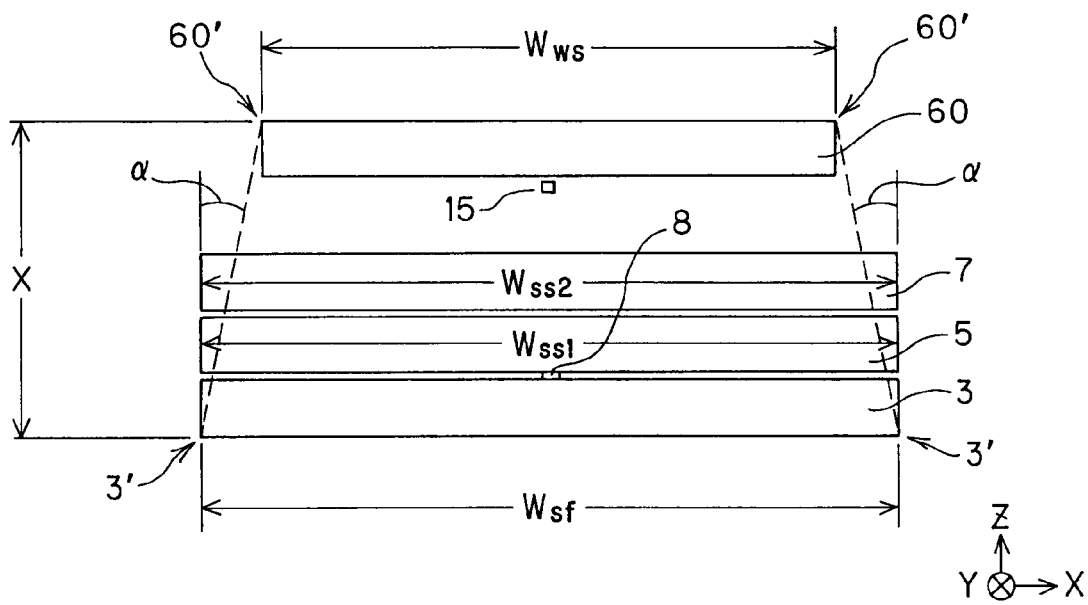
FIG. 8 is illustrative of the structure of part of the thin-film magnetic head (the third embodiment), as viewed from the air bearing surface.

(3) Third Embodiment (Corresponding to FIG. 8)

The third embodiment of FIG. 8 differs from the first embodiment of FIG. 6 in that the upper read shield layer is divided into two shield layers 5, 7 via a non-magnetic layer in the thickness direction: it includes the upper first read shield layer 5 and the upper second read shield layer 7 from below. That is, the third embodiment of FIG. 8 is the same as the embodiment of FIG. 1, and includes the upper read shield layer comprising two shield layers 5, 7.

In the third embodiment, there is the relation: Wws<Wsf=Wss1=Wss2 as shown in FIG. 8, where Wws is the width of the write shield layer 60, Wsf is the width of the lower read shield layer 3, Wss1 is the width of the upper first read shield layer 5, and Wss2 is the width of the upper second read shield layer 7.

And then, a rectangle drawn by connecting both ends 60', 60' across the width Wws of the write shield layer 60 shown in FIG. 8 with both ends 3', 3' across the width Wsf of the lower read shield layer 3 takes on a regular trapezoidal shape with two equal base angles. Here let X stand for the maximum distance (corresponding to the height of the trapezoid) between the write shield layer 60 and the lower read shield layer 3 in the thickness direction. Then, the width Wws of the write shield layer 60 and the width Wsf of the lower read shield layer 3 are set in such a way as to satisfy the following condition with the maximum skew angle $\alpha_{max}$ factored in:

$$Wws < Wsf - 2X \cdot \tan \alpha_{max}$$

By satisfaction of that condition, it is unlikely that both ends 60', 60' across the width Wws of the write shield layer 60 and both ends 3', 3' across the width Wsf of the lower read shield layer 3 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 3', 3' across the width Wsf of the lower read shield layer 3 refer to the edges of the lower read shield layer 3 on the leading side in the thickness direction, as shown. Why weight is given to such specific edges in the invention resides on the inventors' findings that when there is an external magnetic field applied to the third embodiment of FIG. 8 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

In FIG. 8, Wws<Wsf=Wss1=Wss2; however, these relations may just as well be Wws<Wss1=Wss2<Wsf, Wws<Wss1<Wss2<Wsf, or Wws<Wss2<Wss1<Wsf.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid lower read shield layer on the air bearing surface in the width direction do not overlap on the same track until the skew angle is past the maximum skew angle $\alpha_{max}$.

Figure 9:
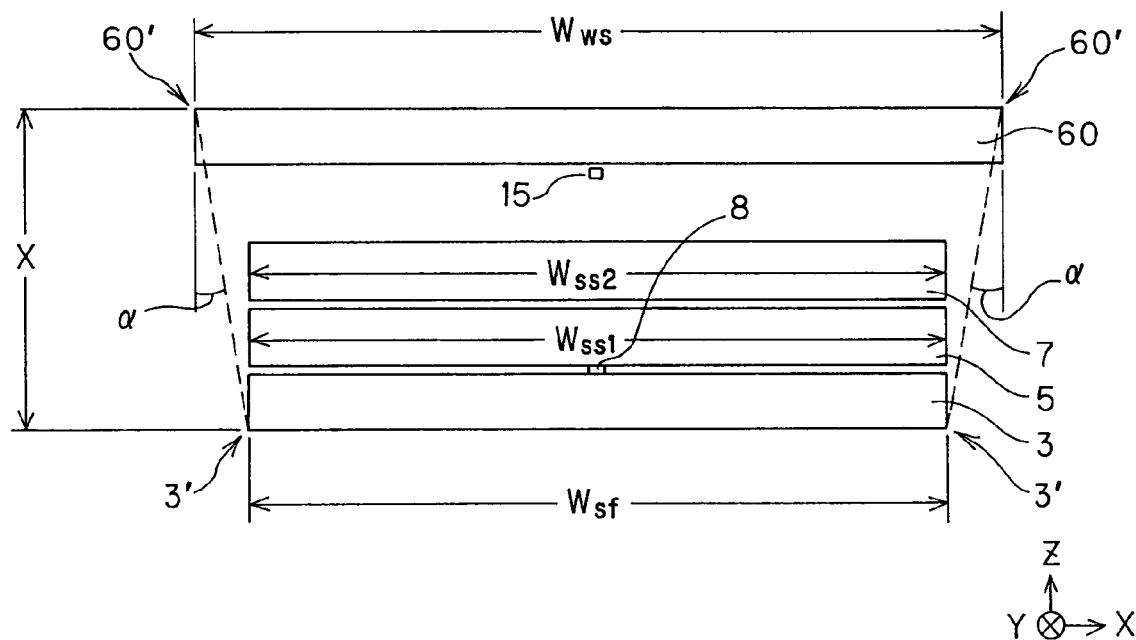
FIG. 9 is illustrative of the structure of part of the thin-film magnetic head (the fourth embodiment), as viewed from the air bearing surface.

(4) Fourth Embodiment (Corresponding to FIG. 9)

In the fourth embodiment, there is the relation: Wws>Wsf=Wss1=Wss2 as shown in FIG. 9, where Wws is the width of the write shield layer 60, Wsf is the width of the lower read shield layer 3, Wss1 is the width of the upper first read shield layer 5, and Wss2 is the width of the upper second read shield layer 7.

And then, a rectangle drawn by connecting both ends 60', 60' across the width Wws of the write shield layer 60 shown in FIG. 9 with both ends 3', 3' across the width Wsf of the lower read shield layer 3 takes on a regular trapezoidal shape with two equal base angles. Here let X stand for the maximum distance (corresponding to the height of the trapezoid) between the write shield layer 60 and the lower read shield layer 3 in the thickness direction. Then, the width Wws of the write shield layer 60 and the width Wsf of the lower read shield layer 3 are set in such a way as to satisfy the following condition with the maximum skew angle $\alpha_{max}$ factored in:

$$Wws > Wsf + 2X \cdot \tan \alpha_{max}$$

By satisfaction of that condition, it is unlikely that both ends 60', 60' across the width Wws of the write shield layer 60 and both ends 3', 3' across the width Wsf of the lower read shield layer 3 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 3', 3' across the width Wsf of the lower read shield layer 3 refer to the edges of the lower read shield layer 3 on the leading side in the thickness direction, as shown. Why weight is given to such specific edges in the invention resides on the inventors' findings that when there is an external magnetic field applied to the fourth embodiment of FIG. 9 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

In FIG. 9, Wws>Wsf=Wss1=Wss2; however, these relations may just as well be Wws>Wsf>Wss1=Wss2, Wws>Wsf>Wss1>Wss2, or Wws>Wsf>Wss2>Wss1.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid lower read shield layer on the air bearing surface in the width direction do not overlap on the same track until the skew angle is past the maximum skew angle $\alpha_{max}$.

Figure 10:
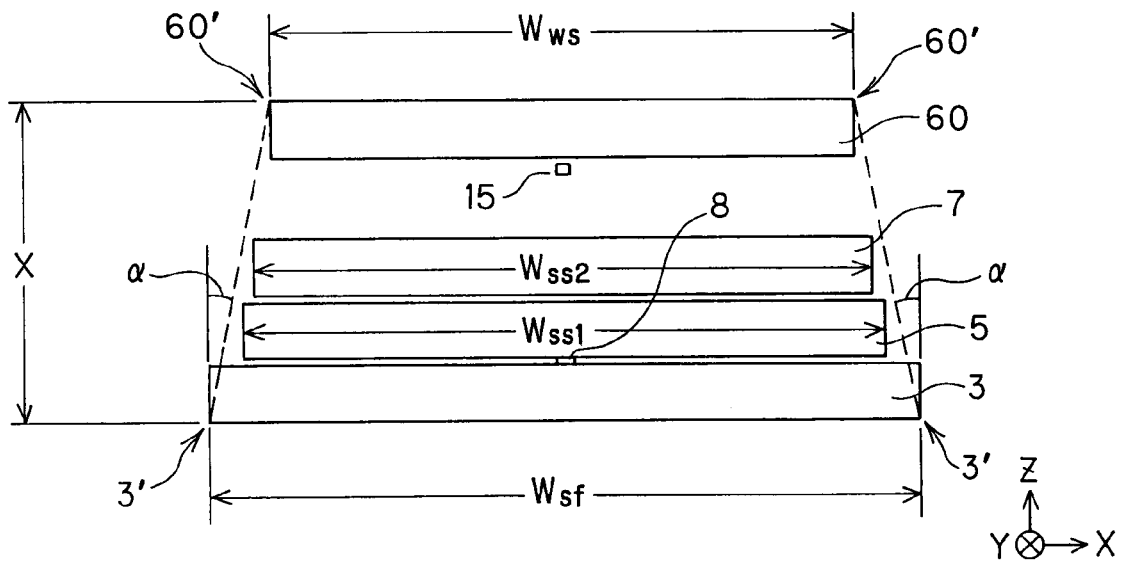
FIG. 10 is illustrative of the structure of part of the thin-film magnetic head (the fifth embodiment), as viewed from the air bearing surface.

(5) Fifth Embodiment (Corresponding to FIG. 10)

The fifth embodiment of FIG. 10 differs from the third embodiment of FIG. 8 in that of the three read shield layers 3, 5 and 7, the lower read shield layer 3 has the greatest width, as shown in FIG. 10.

In the fifth embodiment, there is thus the relation: Wws<Wss2<Wss1<Wsf, where Wws is the width of the write shield layer 60, Wsf is the width of the lower read shield layer 3, Wss1 is the width of the upper first read shield layer 5, and Wss2 is the width of the upper second read shield layer 7.

And then, a rectangle drawn by connecting both ends 60', 60' across the width Wws of the write shield layer 60 shown in FIG. 10 with both ends 3', 3' across the width Wsf of the lower read shield layer 3 takes on a regular trapezoidal shape with two equal base angles. Here let X stand for the maximum distance (corresponding to the height of the trapezoid) between the write shield layer 60 and the lower read shield layer 3 in the thickness direction. Then, the width Wws of the write shield layer 60 and the width Wsf of the lower read shield layer 3 are set in such a way as to satisfy the following condition with the maximum skew angle $\alpha_{max}$ factored in:

$$Wws < Wsf - 2X \cdot \tan \alpha_{max}$$

By satisfaction of that condition, it is unlikely that both ends 60', 60' of the width Wws of the write shield layer 60 and both ends 3', 3' of the width Wsf of the lower read shield layer 3 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 3', 3' across the width Wsf of the lower read shield layer 3 refer to the edges of the lower read shield layer 3 on the leading side in the thickness direction, as shown. Why weight is given to such specific edges in the invention resides on the inventors' findings that when there is an external magnetic field applied to the fifth embodiment of FIG. 10 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

This fifth embodiment of FIG. 10 falls under the category of the most preferred aspect of the invention.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid lower read shield layer on the air bearing surface in the width direction do not overlap on the same track until the skew angle is past the maximum skew angle $\alpha_{max}$.

(Why Wss2<Wss1 is Preferred)

The lower read shield layer 3 and upper first read shield layer 5 are required to have dimensional precision, because of being shields for the MR device 8 that is the reader. Therefore, the lower read shield layer 3 and upper first read shield layer 5 are formed on a flat surface made by use of CPM processing. No particular limitation is imposed on the width size of those layers because they are formed on the flat surface. On the other hand, there is no demand for the upper second read shield layer 7 to have high precision. For this reason, usually, the upper first read shield layer 5 is formed; an insulating layer is then formed on that upper first read shield layer 5 without CPM processing; and the upper second read shield layer 7 is formed on that insulating layer. Due to the presence of a step defined by the upper first read shield layer 5, it is preferable that the upper second read shield layer 7 is formed a little smaller than the upper first read shield layer 5.

(Why Wss1<Wsf is Preferred)

The reason is that it has been confirmed through experimentation that the write magnetic field is more kept back from increasing by making the width Wsf of the lower read shield layer 3 wider than the width Wss1 of the upper first read shield layer 5 (Wss1<Wsf) than otherwise (Wss1>Wsf).

Figure 11:
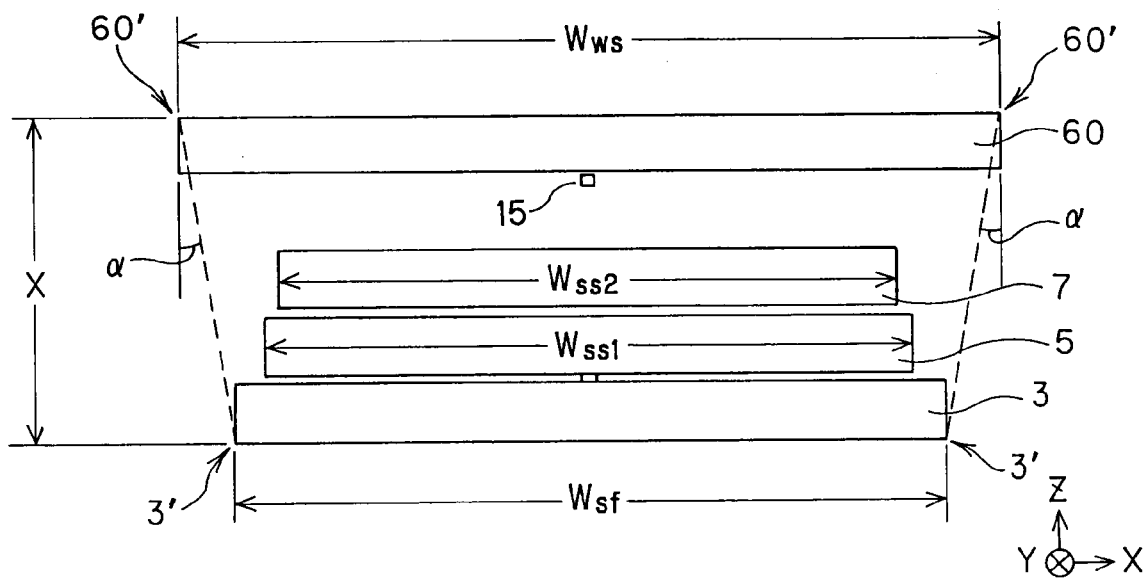
FIG. 11 is illustrative of the structure of part of the thin-film magnetic head (the sixth embodiment), as viewed from the air bearing surface.

(6) Six Embodiment (Corresponding to FIG. 11)

The sixth embodiment of FIG. 11 differs from the fourth embodiment of FIG. 9 in that of the three read shield layers 3, 5 and 7, the lower read shield layer 3 has the greatest width, as shown in FIG. 10.

In the sixth embodiment, there is thus the relation: Wss2<Wss1<Wsf<Wws, where Wws is the width of the write shield layer 60, Wsf is the width of the lower read shield layer 3, Wss1 is the width of the upper first read shield layer 5, and Wss2 is the width of the upper second read shield layer 7.

And then, a rectangle drawn by connecting both ends 60', 60' across the width Wws of the write shield layer 60 shown in FIG. 11 with both ends 3', 3' across the width Wsf of the lower read shield layer 3 takes on a regular trapezoidal shape with two equal base angles. Here let X stand for the maximum distance (corresponding to the height of the trapezoid) between the write shield layer 60 and the lower read shield layer 3 in the thickness direction. Then, the width Wws of the write shield layer 60 and the width Wsf of the lower read shield layer 3 are set in such a way as to satisfy the following condition with the maximum skew angle $\alpha_{max}$ factored in:

$$Wws > Wsf + 2X \cdot \tan \alpha_{max}$$

By satisfaction of that condition, it is unlikely that both ends 60', 60' across the width Wws of the write shield layer 60 and both ends 3', 3' across the width Wsf of the lower read shield layer 3 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 3', 3' across the width Wsf of the lower read shield layer 3 refer to the edges of the lower read shield layer 3 on the leading side in the thickness direction, as shown. Why weight is given to such specific edges in the invention resides on the inventors' findings that when there is an external magnetic field applied to the sixth embodiment of FIG. 11 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid lower read shield layer on the air bearing surface in the width direction do not overlap on the same track until the skew angle is past the maximum skew angle $\alpha_{max}$.

Figure 12:
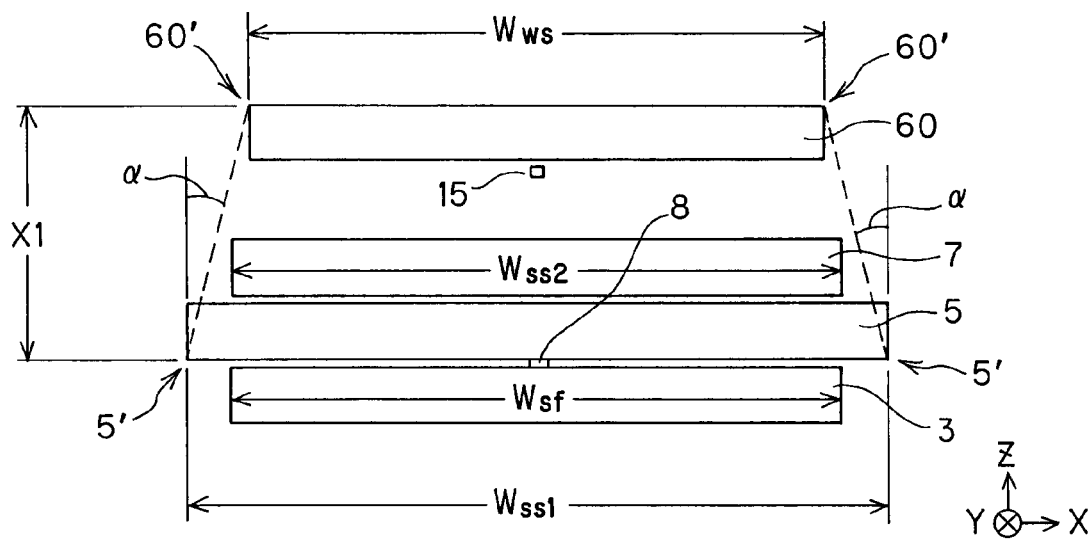
FIG. 12 is illustrative of the structure of part of the thin-film magnetic head (the seventh embodiment), as viewed from the air bearing surface.

(7) Seventh Embodiment (Corresponding to FIG. 12)

The seventh embodiment of FIG. 12 differs from the fifth embodiment of FIG. 10 in that of the three read shield layers 3, 5 and 7, the lower read shield layer 5 at the middle has the greatest width, as shown in FIG. 12.

In the seventh embodiment, there is thus the relation: Wws<Wss2=Wsf<Wss1, where Wws is the width of the write shield layer 60, Wsf is the width of the lower read shield layer 3, Wss1 is the width of the upper first read shield layer 5, and Wss2 is the width of the upper second read shield layer 7.

And then, a rectangle drawn by connecting both ends 60', 60' across the width Wws of the write shield layer 60 shown in FIG. 12 with both ends 5', 5' across the width Wss1 of the upper first read shield layer 5 takes on a regular trapezoidal shape with two equal base angles. Here let X1 stand for the maximum distance (corresponding to the height of the trapezoid) between the write shield layer 60 and the upper first read shield layer 5 in the thickness direction. Then, the width Wws of the write shield layer 60 and the width Wss1 of the upper first read shield layer 5 are set in such a way as to satisfy the following condition with the maximum skew angle $\alpha_{max}$ factored in:

$$Wws > Wss1 - 2X1 \cdot \tan \alpha_{max}$$

By satisfaction of that condition, it is unlikely that both ends 60', 60' across the width Wws of the write shield layer 60 and both ends 5', 5' across the width Wss1 of the upper first read shield layer 5 overlap on the same track until the skew angle is past the maximum skew angle $\alpha_{max}$: there is the advantage obtained that when there is an external magnetic field applied, the already written signals are kept back from degradation.

In the invention, both ends 60', 60' of the width Wws of the write shield layer 60 refer to the edges of the write shield layer 60 on the trailing side in the thickness direction, as shown. Similarly, both ends 5', 5' of the width Wss1 of the upper first read shield layer 5 refer to the edges of the lower read shield layer 3 on the leading side in the thickness direction, as shown. Why weight is given to such specific edges in the invention resides on the inventors' findings that when there is an external magnetic field applied to the seventh embodiment of FIG. 12 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

In FIG. 12, Wws<Wss2=Wsf<Wss1; however, these relations may just as well be Wws<Wss2<Wsf<Wss1, or Wws<Wsf<Wss2<Wss1.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid upper first read shield layer on the air bearing surface in the width direction do not overlap on the same track until the skew angle is past the maximum skew angle $\alpha_{max}$.

Figure 13:
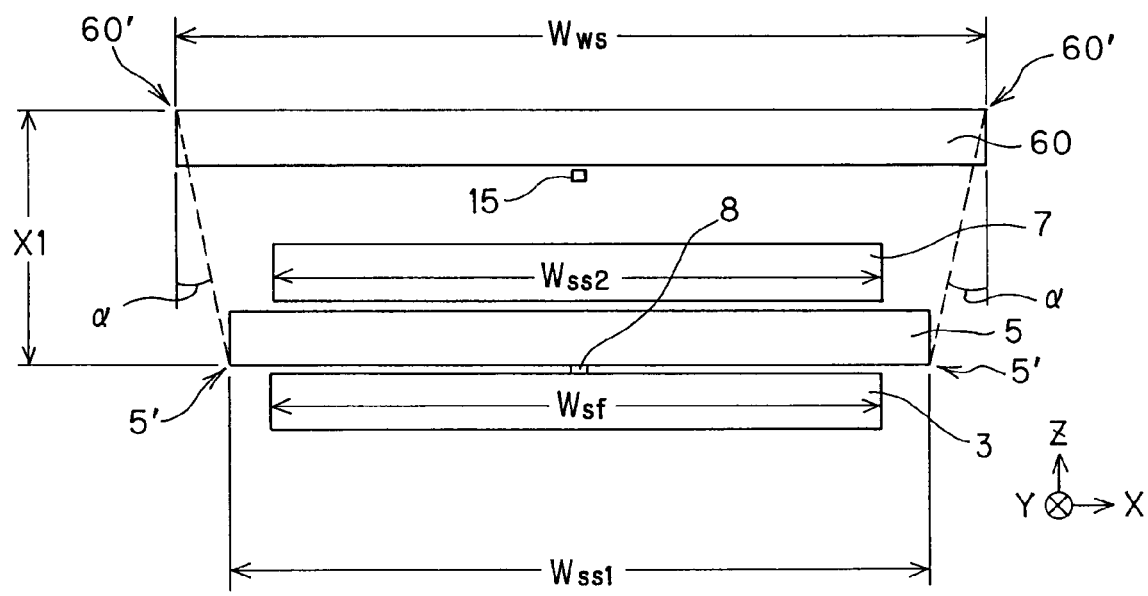
FIG. 13 is illustrative of the structure of part of the thin-film magnetic head (the eighth embodiment), as viewed from the air bearing surface.

(8) Eighth Embodiment (Corresponding to FIG. 13)

The eighth embodiment of FIG. 13 differs from the sixth embodiment of FIG. 11 in that of the three read shield layers 3, 5 and 7, the upper first read shield layer 5 at the middle has the greatest width, as shown in FIG. 13.

In the eighth embodiment, there is thus the relation: Wss2=Wsf<Wss1<Wws, where Wws is the width of the write shield layer 60, Wsf is the width of the lower read shield layer 3, Wss1 is the width of the upper first read shield layer 5, and Wss2 is the width of the upper second read shield layer 7.

And then, a rectangle drawn by connecting both ends 60', 60' cross the width Wws of the write shield layer 60 shown in FIG. 13 with both ends 5', 5' across the width Wss1 of the upper first read shield layer 5 takes on a regular trapezoidal shape with two equal base angles. Here let X1 stand for the maximum distance (corresponding to the height of the trapezoid) between the write shield layer 60 and the upper first read shield layer 5 in the thickness direction. Then, the width Wws of the write shield layer 60 and the width Wss1 of the upper first read shield layer 5 are set in such a way as to satisfy the following condition with the maximum skew angle $\alpha_{max}$ factored in:

$$Wws > Wss1 + 2X1 \cdot \tan \alpha_{max}$$

By satisfaction of that condition, it is unlikely that both ends 60', 60' across the width Wws of the write shield layer 60 and both ends 5', 5' across the width Wss1 of the upper first read shield layer 5 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 5', 5' across the width Wss1 of the upper first read shield layer 5 refer to the edges of the upper first read shield layer 5 on the leading side in the thickness direction, as shown. Why weight is given to such specific edges in the invention resides on the inventors' findings that when there is an external magnetic field applied to the seventh embodiment of FIG. 12 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

In FIG. 13, Wss2=Wsf<Wss1<Wws; however, these relations may just as well be Wss2<Wsf<Wss1<Wws, or Wsf<Wss2<Wss1<Wws.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid upper first read shield layer on the air bearing surface in the width direction do not overlap on the same track until the skew angle is past the maximum skew angle $\alpha_{max}$.

Figure 14:
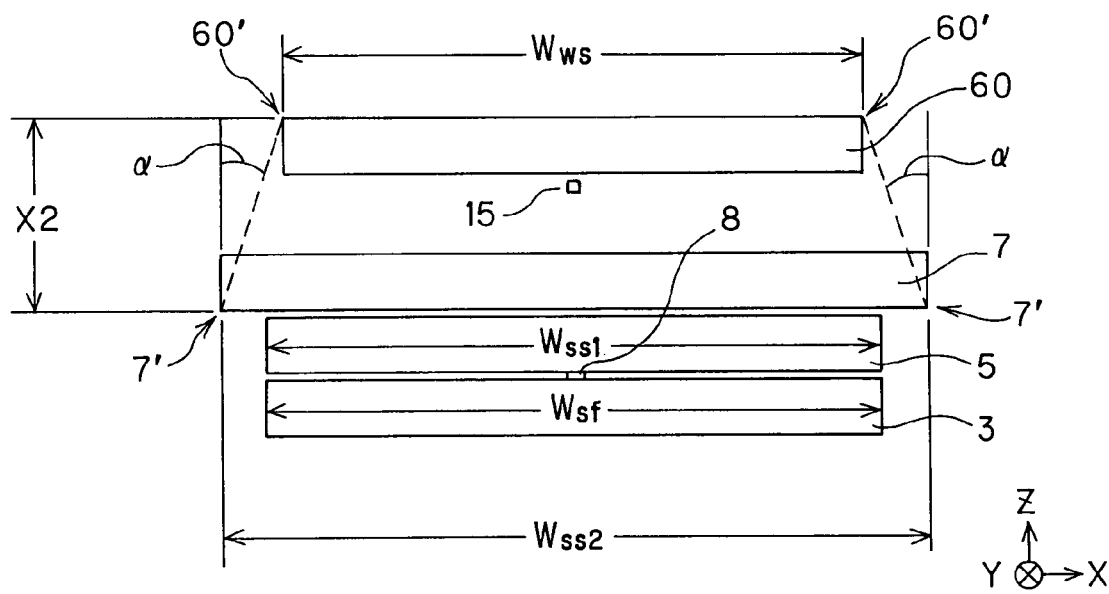
FIG. 14 is illustrative of the structure of part of the thin-film magnetic head (the ninth embodiment), as viewed from the air bearing surface.

(9) Ninth Embodiment (Corresponding to FIG. 14)

The ninth embodiment of FIG. 14 differs from the seventh embodiment of FIG. 12 in that of the three read shield layers 3, 5 and 7, the upper second read shield layer 7 at the uppermost position has the greatest width, as shown in FIG. 14.

In the ninth embodiment, there is thus the relation: Wws<Wss1=Wsf<Wss2, where Wws is the width of the write shield layer 60, Wsf is the width of the lower read shield layer 3, Wss1 is the width of the upper first read shield layer 5, and Wss2 is the width of the upper second read shield layer 7.

And then, a rectangle drawn by connecting both ends 60', 60' across the width Wws of the write shield layer 60 shown in FIG. 14 with both ends 7', 7' across the width Wss2 of the upper second read shield layer 7 takes on a regular trapezoidal shape with two equal base angles. Here let X2 stand for the maximum distance (corresponding to the height of the trapezoid) between the write shield layer 60 and the upper second read shield layer 7 in the thickness direction. Then, the width Wws of the write shield layer 60 and the width Wss2 of the upper second read shield layer 7 are set in such a way as to satisfy the following condition with the maximum skew angle $\alpha_{max}$ factored in:

$$Wws < Wss2 - 2X2 \cdot \tan \alpha_{max}$$

By satisfaction of that condition, it is unlikely that both ends 60', 60' across the width Wws of the write shield layer 60 and both ends 7', 7' across the width Wss2 of the upper second read shield layer 7 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 7', 7' across the width Wss1 of the upper second read shield layer 7 refer to the edges of the upper second read shield layer 7 on the leading side in the thickness direction, as shown. Why weight is given to such specific edges in the invention resides on the inventors' findings that when there is an external magnetic field applied to the seventh embodiment of FIG. 14 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

In FIG. 14, Wws<Wss1=Wsf<Wss2; however, these relations may just as well be Wws<Wss1<Wsf<Wss2, or Wws<Wsf<Wss1<Wss2, although not that preferable in view of fabrication processes.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid upper second read shield layer on the air bearing surface in the width direction do not overlap on the same track until the skew angle is past the maximum skew angle $\alpha_{max}$.

Figure 15:
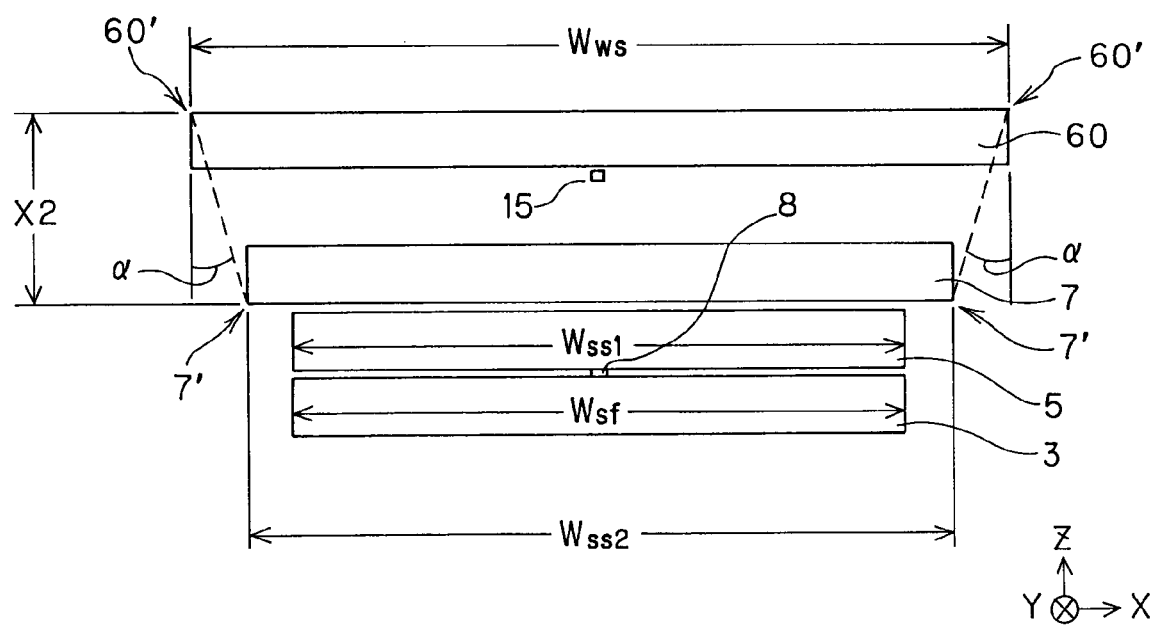
FIG. 15 is illustrative of the structure of part of the thin-film magnetic head (the tenth embodiment), as viewed from the air bearing surface.

(10) Tenth Embodiment (Corresponding to FIG. 15)

The tenth embodiment of FIG. 15 differs from the eighth embodiment of FIG. 13 in that of the three read shield layers 3, 5 and 7, the upper second read shield layer 7 at the uppermost position has the greatest width, as shown in FIG. 15.

In the tenth embodiment, there is thus the relation: Wss1=Wsf<Wss2<Wws, where Wws is the width of the write shield layer 60, Wsf is the width of the lower read shield layer 3, Wss1 is the width of the upper first read shield layer 5, and Wss2 is the width of the upper second read shield layer 7.

And then, a rectangle drawn by connecting both ends 60', 60' across the width Wws of the write shield layer 60 shown in FIG. 15 with both ends 7', 7' across the width Wss2 of the upper second read shield layer 7 takes on a regular trapezoidal shape with two equal base angles. Here let X2 stand for the maximum distance (corresponding to the height of the trapezoid) between the write shield layer 60 and the upper second read shield layer 7 in the thickness direction. Then, the width Wws of the write shield layer 60 and the width Wss2 of the upper second read shield layer 7 are set in such a way as to satisfy the following condition with the maximum skew angle $\alpha_{max}$ factored in:

$$Wws > Wss2 + 2X2 \cdot \tan \alpha_{max}$$

By satisfaction of that condition, it is unlikely that both ends 60', 60' across the width Wws of the write shield layer 60 and both ends 7', 7' across the width Wss2 of the upper second read shield layer 7 overlap on the same track until the skew angle is past the maximum skew angle $\alpha_{max}$: there is the advantage obtained that when there is an external magnetic field applied, the already written signals are kept back from degradation.

In the invention, both ends 60', 60' across the width Wws of the write shield layer 60 refer to the edges of the write shield layer 60 on the trailing side in the thickness direction, as shown. Similarly, both ends 7', 7' across the width Wss2 of the upper second read shield layer 7 refer to the edges of the upper second read shield layer 7 on the leading side in the thickness direction, as shown. Why weight is given to such specific edges in the invention resides on the inventors' findings that when there is an external magnetic field applied to the tenth embodiment of FIG. 15 in a direction from the rear of the magnetic head in the length direction toward the air bearing surface and in a direction toward the recording medium, the magnetic fields at the aforesaid specific edge sites have much larger values, as could be confirmed from measurements of the magnetic field distribution produced from each shield layer.

In FIG. 15, Wss1=Wsf<Wss2<Wws; however, these relations may just as well be Wss1<Wsf<Wss2<Wws, or Wsf<Wss1<Wss2<Wws.

If, as shown in FIG. 3, the bevel angle β defined by the side and thickness-direction lines of the inverted trapezoidal shape in section is set in such a way as to be the same as the maximum skew angle $\alpha_{max}$, it is also possible to design a thin-film magnetic head such that both ends of the aforesaid write shield layer on the air bearing surface in the width direction and both ends of the aforesaid upper second read shield layer on the air bearing surface in the width direction do not overlap on the same track until the skew angle is past the maximum skew angle $\alpha_{max}$.

In the invention, it is noted that the effectiveness of the invention could be more enhanced by elaborately cutting the edges of both ends of each of the write shield layer and the read shield layer at the air bearing surface in the width direction, or somehow adding some thickness to the widthwise parts of both ends in the thickness direction.

Experimental Example I

For a start, to have a grasp of why a magnetic field focuses on the edges of shield layers by use of the finite element method, there were some models prepared, in which of four shield layers, only one had an extremely large width. An external magnetic field of 50 Oe was applied perpendicularly to the medium.

In each model, the shield of the greatest width was about 5 µm larger in width than the rest. In this regard, experimentation has taught that as the width difference is greater than 3 µm, the focusing of a magnetic field onto the edge portions grows sharply tight.

Suppose here that there is a shield of the greatest width in an ordinary magnetic head. Even then, that shield should generally be about 2.5 µm larger in width than the rest (corresponding to FIGS. 6-15).

Model 1 was made by modifying the aforesaid fourth embodiment (corresponding to FIG. 9) such that the width of the write shield layer 60 was by far larger (about 5 µm).

Model 2 was made by modifying the aforesaid fifth embodiment (corresponding to FIG. 10) such that the width of the lower read shield layer 3 was by far larger (about 5 µm).

Model 3 was made by modifying the aforesaid seventh embodiment (corresponding to FIG. 12) such that the width of the upper first read shield layer 5 was by far larger (about 5 µm).

Model 4 was made by modifying the aforesaid ninth embodiment (corresponding to FIG. 14) such that the width of the upper second read shield layer 7 was by far larger (about 5 µm).

An external magnetic field was applied to such model 1, 2, 3, and 4 in a direction from the rear of the magnetic head in the length direction toward the air bearing surface and in a direction toward the recording medium to figure out the magnetic field distribution generated from each shield layer pursuant to the following manner.

In the whole structure of the thin-film magnetic head as previously described (see FIGS. 1, 2 and 3), the constructions (mutually correlated widths in particular) of the write shield layer 60, the read shield layers 3, 5, 7, etc. were set as in the case of the aforesaid models 1, 2, 3 and 4 (FIGS. 19-22).

The write shield layer was made of CoFeNi, and each read shield layer was made of $Ni_{80}Fe_{20}$.

Figure 16:
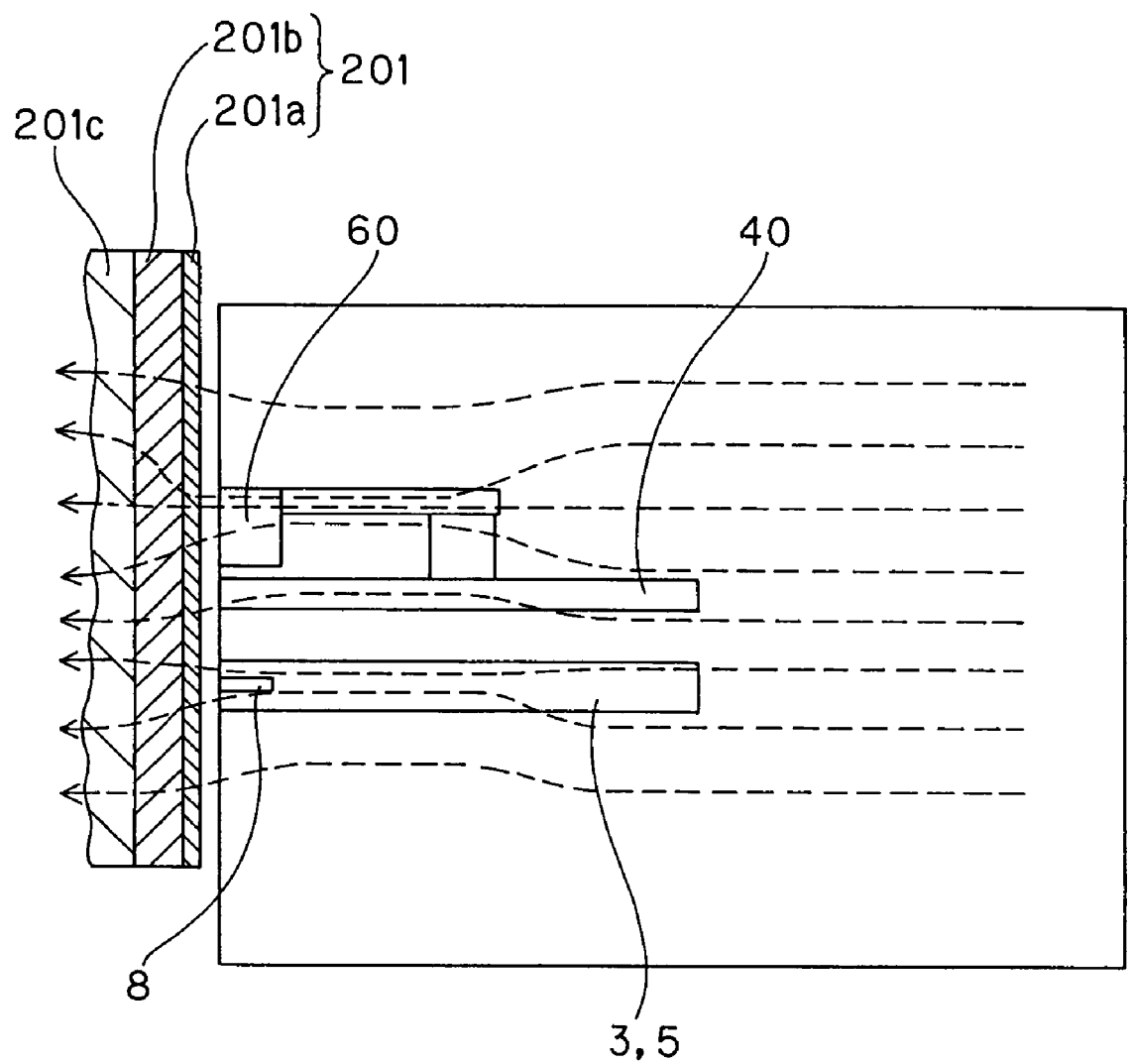
FIG. 16 is a sectional schematic for illustrating what relations the recording medium and the thin-film magnetic head have, and what state an external magnetic field is applied in, in specific experimentation of the invention.

For the model 1, 2, 3, and 4, the distribution of areas magnetized in the same quantity of magnetization was found at its location with respect to such a recording medium 201 (hard disk 201) as shown in FIG. 16, and at the air bearing surface of each shield layer under the conditions mentioned just below. That is, the distribution of an isomagnetization curve was found.

(Condition Settings)

A magnetic field responsible for demagnetization by an external magnetic field is affected by a distance as far as a so-called lining layer 201b of the recording medium (media) (the soft magnetic underlay layer 201b underlying a perpendicular magnetic recording layer 201a) and the thickness and saturation flux density Bs of the lining layer, let alone the writer and reader. Note here that a group of dotted lines flowing from right to left of the paper of FIG. 16 is indicative in schematic of a magnetic flux flow. As shown in FIG. 16, magnetic fluxes are concentrated onto the air bearing surface of the write shield layer 60 and the air bearing surface (ABS) of the read shield layer 3, 5. Reference numeral 201c stands for a substrate.

The conditions for the recording medium (media), etc. were set as follows:

Direction of the external magnetic field: Perpendicular to the recording medium (media);

Strength of the external magnetic field: 4,000 [A/m];

Saturation flux density Bs of the lining layer of the recording medium: 1.0 [T];

Thickness of the lining layer of the recording medium: 100 [nm];

Distance between the head and the lining layer of the recording medium: 50 [nm] from the air bearing surface; and Position for the calculation of the magnetic field distribution: Position 20 nm away from the ABS toward the recording medium (media) side.

Under these conditions, simulation was implemented to find the distribution of areas magnetized in the same quantity of magnetization at both ends of the write shield layer at the air bearing surface and both ends of the read shield layer at the air bearing surface.

The distributions of the obtained isomagnetization curves, as traced in an easy-to-see way, are presented in FIGS. 19-22. Each drawing is now explained.

Figure 19:
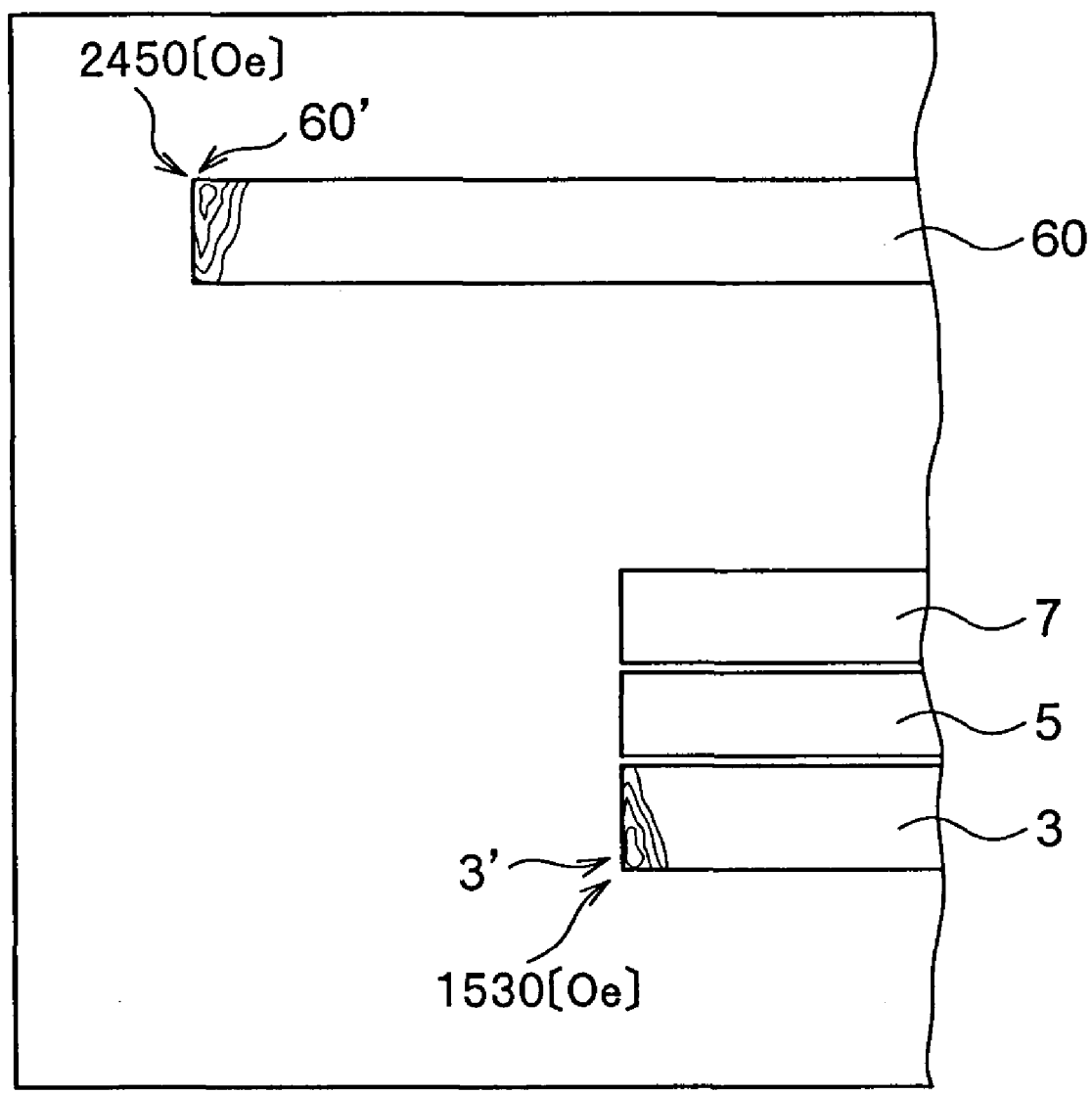
FIG. 19 is illustrative of part of the iso-magnetization curve for Model 1.

An image of the distribution of the isomagnetization curve for Model 1 is shown in FIG. 19. As can be seen from FIG. 19, there is a peak of the magnetic field distribution for the end 60' of the width Wws of the write shield layer 60, with a peak value of 2,450 Oe, and there is a peak of the magnetic field distribution for the end 3' of the width Wsf of the lower read shield layer 3, with a peak value of 1,530 Oe.

Figure 20:
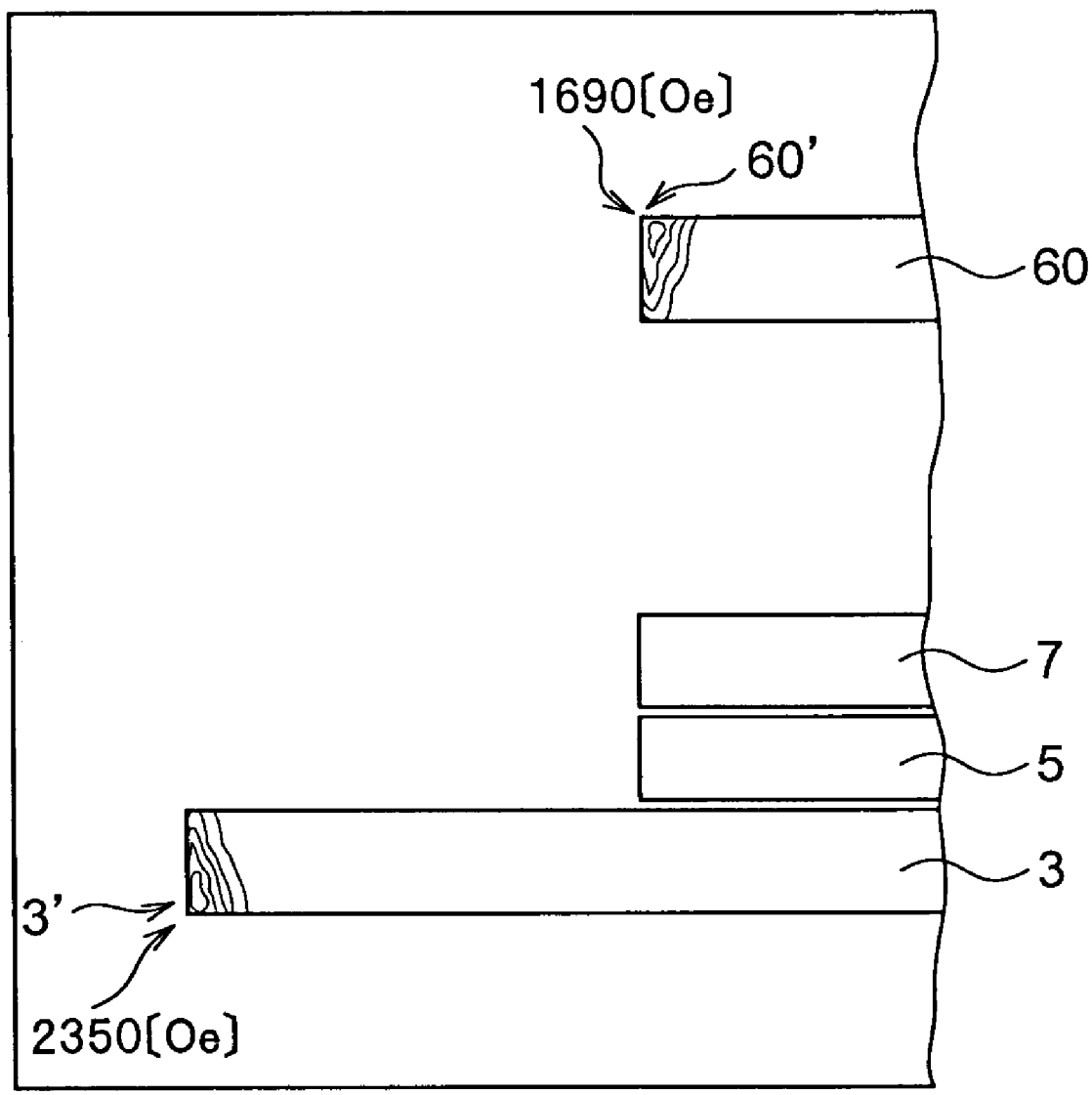
FIG. 20 is illustrative of part of the iso-magnetization curve for Model 2.

An image of the distribution of the isomagnetization curve for Model 2 is shown in FIG. 20. As can be seen from FIG. 20, there is a peak of the magnetic field distribution for the end 60' of the width Wws of the write shield layer 60, with a peak value of 1,690 Oe, and there is a peak of the magnetic field distribution for the end 3' of the width Wsf of the lower read shield layer 3, with a peak value of 2,350 Oe.

Figure 21:
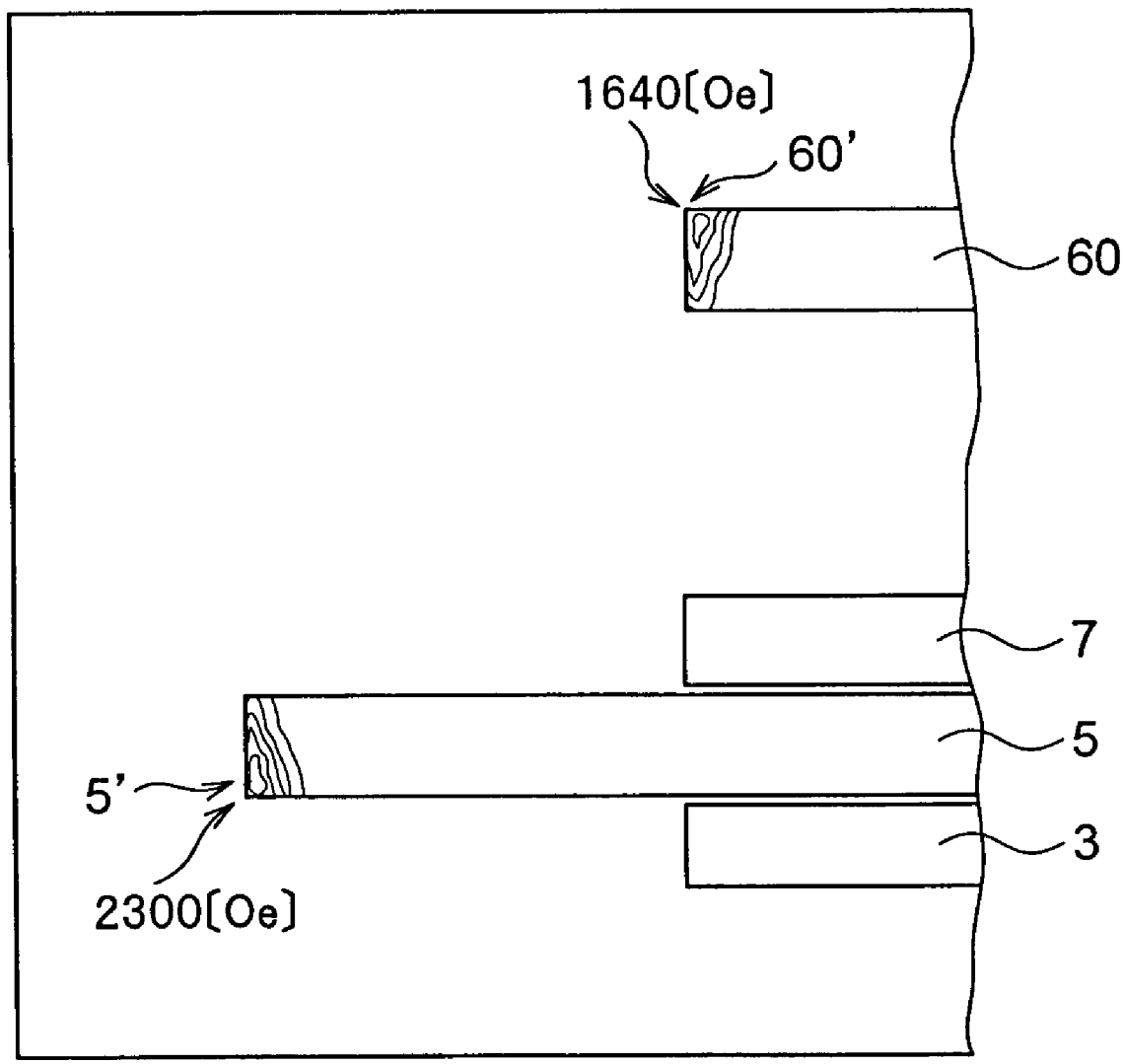
FIG. 21 is illustrative of part of the iso-magnetization curve for Model 3.

An image of the distribution of the isomagnetization curve for Model 3 is shown in FIG. 21. As can be seen from FIG. 21, there is a peak of the magnetic field distribution for the end 60' of the width Wws of the write shield layer 60, with a peak value of 1,640 Oe, and there is a peak of the magnetic field distribution for the end 5' of the width Wss1 of the upper first read shield layer 5, with a peak value of 2,300 Oe.

Figure 22:
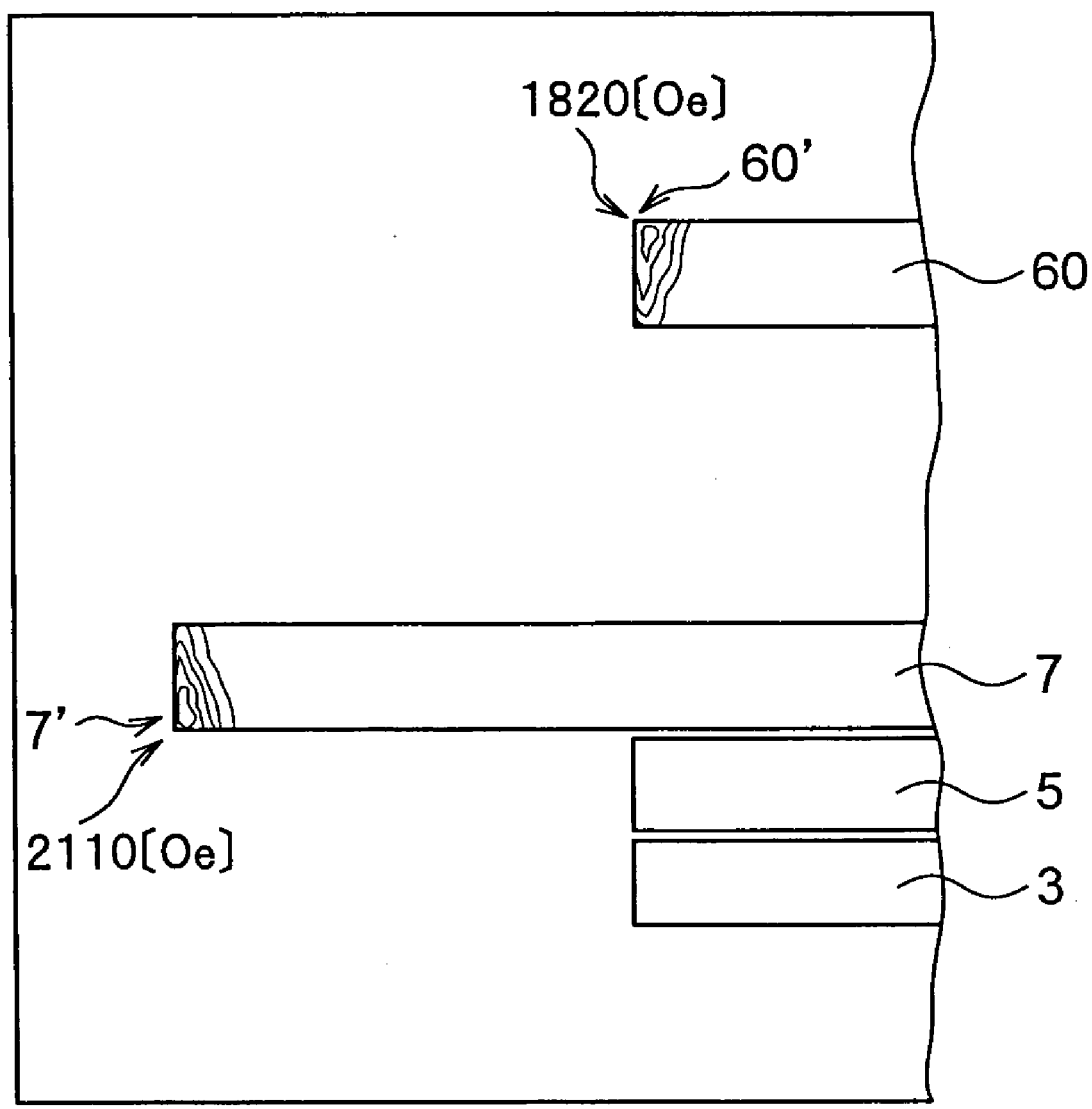
FIG. 22 is illustrative of part of the iso-magnetization curve for Model 4.

An image of the distribution of the isomagnetization curve for Model 4 is shown in FIG. 22. As can be seen from FIG. 22, there is a peak of the magnetic field distribution for the end 60' of the width Wws of the write shield layer 60, with a peak value of 1,820 Oe, and there is a peak of the magnetic field distribution for the end 7' of the width Wss2 of the upper second read shield layer 7, with a peak value of 2,110 Oe.

From these drawings, it is appreciated that the magnetic fields focus onto the edges.

As long as the shield is not saturated, there is no writing difference at the edges; the shield may be made of any desired magnetic material. It would be unlikely that the shield is not saturated because of having basically a large area. In case the shield is saturated for some unknown reasons, however, it would lose its own shield function. Therefore, when there is a large external magnetic field expected, it is preferable to make a selection from materials having much higher saturation flux density Bs.

Experimental Example II

A sample was prepared by allowing the whole structure of the thin-film magnetic head as previously described (see FIGS. 1, 2 and 3) to comprise the given write shield layer 60 and read shield layers 3, 5, 7. This sample was used to find a track erasure rate (%)—TE rate (%) that is indicative of to what degree (%) the previously written output (an initial value of 100%) was maintained after deterioration by the track erasure at the time when an external magnetic field of as large as 300 Oe (23,870 A/m) was applied perpendicularly to the recording medium (media). The higher the value of the TE rate (%), the lesser that output is affected by the track erasure: the output is in a good state.

Figure 17:
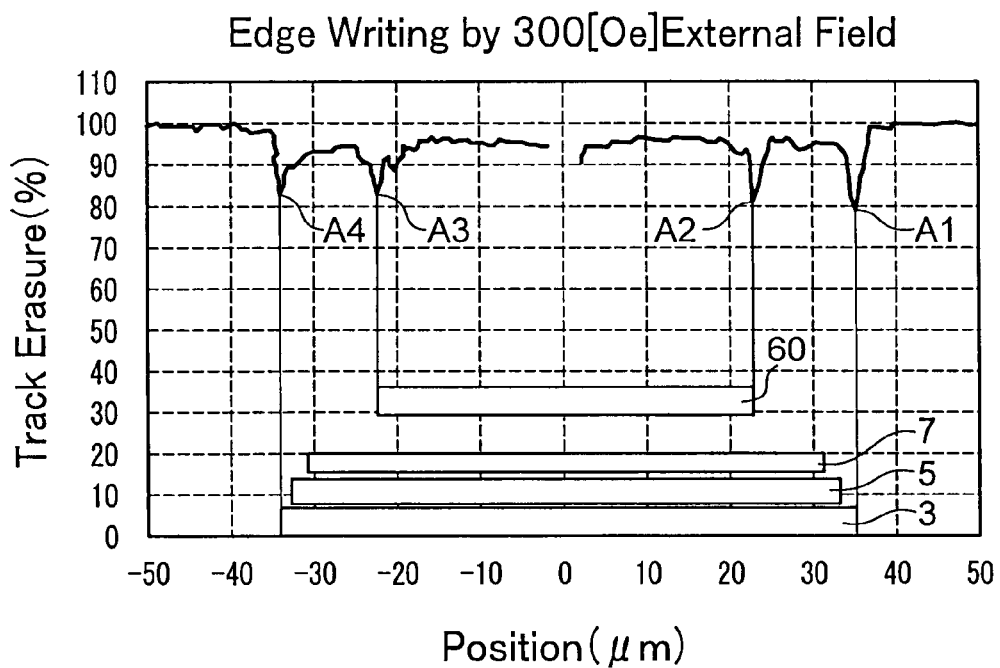
FIG. 17 is illustrative of data experimentally indicative of what goes on in the invention of this application (with the position of each shield as abscissa and track erasure rate (%) as ordinate) with the skew angle factored out, and where to locate each shield layer.
Figure 18:
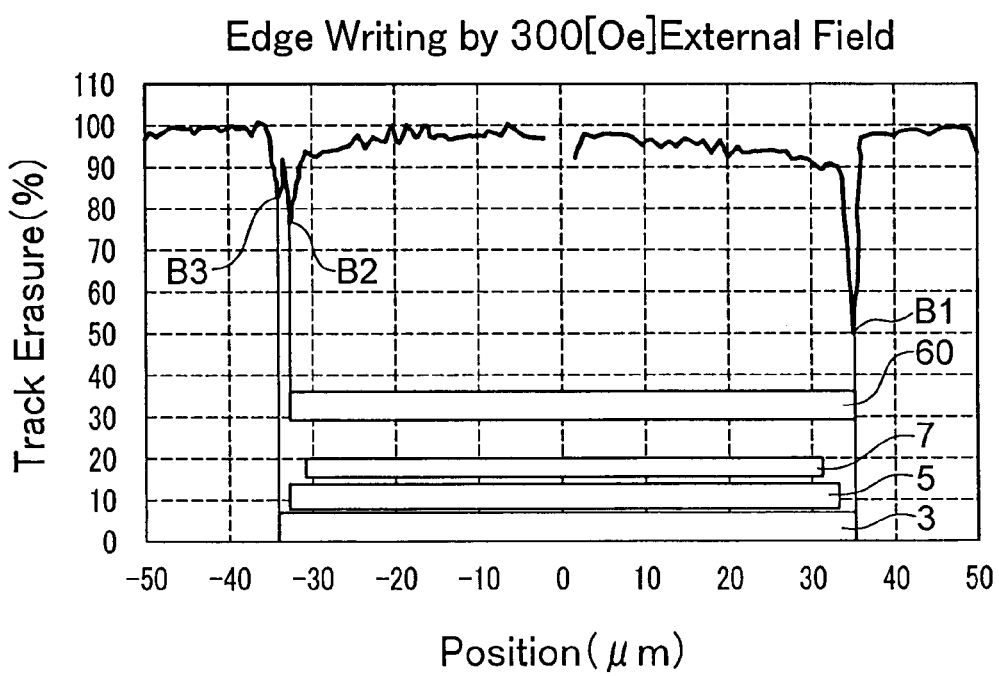
FIG. 18 is illustrative of data experimentally indicative of what goes on in the invention of this application (with the position of each shield as abscissa and track erasure rate (%) as ordinate) with the skew angle factored out, and where to locate each shield layer.

For an easy understanding of the concept of the invention of this application, data experimentally indicative of what goes on in the invention of this application are plotted in FIGS. 17 and 18 (with the position of each shield as abscissa and the track erasure rate (%) as ordinate), and where to locate each shield is shown, too. In FIGS. 17 and 18, reference numeral 60 stands for the write shield layer, and numerals 3, 5, 7 represent the read shield layers, as previously noted.

In FIG. 17 illustrative of where to locate each shield layer, the edges of the write shield layer and the edges of the read shield layers do not overlap on the same track, indicating that even near the edges of each shield layer, there is a TE rate (%) of more than about 80% obtained (downward peaks A1-A4).

In FIG. 18 illustrative of where each shield layer is located, by contrast, the right end edge of the write shield layer 60 and the right end edge of the read shield layer 3 overlap on the same track, indicating that, at that site, the TE erasure rate (%) goes down to as low as about 50% (downward peak B1).

Similarly in each of the $1^{st}$ to $10^{th}$ embodiments (FIGS. 6-15), there was the track erasure rate (TE rate (%)) found, indicative of to what degree (%) the previously written output (an initial value of 100%) was maintained after deterioration by the track erasure at the time when an external magnetic field of as large as 300 Oe (23,870 A/m) was applied perpendicularly to the recording medium (media).

The results are set out below.

First Embodiment (Corresponding to FIG. 6)

(i) When the ends 60' and 3' do not overlap on the same data track (inventive), TE rate=85% at both ends 60', 60' across the width Wws of the write shield layer 60; and TE rate=84% at both ends 3', 3' across the width Wsf of the lower read shield layer 3.

(ii) When the ends 60' and 3' overlap on the same data track (comparative), TE rate=55% at an overlap of the ends 60' and 3'.

Second Embodiment (Corresponding to FIG. 7)

(i) When the ends 60' and 3' do not overlap on the same data track (inventive), TE rate=80% at both ends 60', 60' across the width Wws of the write shield layer 60; and TE rate=84% at both ends 3', 3' across the width Wsf of the lower read shield layer 3.

(ii) When the ends 60' and 3' overlap on the same data track (comparative), TE rate=50% at an overlap of the ends 60' and 3'.

Third Embodiment (Corresponding to FIG. 8)

(i) When the ends 60' and 3' do not overlap on the same data track (inventive), TE rate=85% at both ends 60', 60' across the width Wws of the write shield layer 60; and TE rate=90% at both ends 3', 3' across the width Wsf of the lower read shield layer 3.

(ii) When the ends 60' and 3' overlap on the same data track (comparative), TE rate=60% at an overlap of the ends 60' and 3'.

Fourth Embodiment (Corresponding to FIG. 9)

(i) When the ends 60' and 3' do not overlap on the same data track (inventive), TE rate=80% at both ends 60', 60' across the width Wws of the write shield layer 60 across the; and TE rate=90% at both ends 3', 3' across the width Wsf of the lower read shield layer 3.

(ii) When the ends 60' and 3' overlap on the same data track (comparative), TE rate=55% at an overlap of the ends 60' and 3'.

Fifth Embodiment (Corresponding to FIG. 10)

(i) When the ends 60' and 3' do not overlap on the same data track (inventive), TE rate=85% at both ends 60', 60' across the width Wws of the write shield layer 60; and TE rate=89% at both ends 3', 3' across the width Wsf of the lower read shield layer 3.

(ii) When the ends 60' and 3' overlap on the same data track (comparative), TE rate=60% at an overlap of the ends 60' and 3'.

Sixth Embodiment (Corresponding to FIG. 11)

(i) When the ends 60' and 3' do not overlap on the same data track (inventive), TE rate=80% at both ends 60', 60' across the width Wws of the write shield layer 60; and TE rate=89% at both ends 3', 3' across the width Wsf of the lower read shield layer 3.

(ii) When the ends 60' and 3' overlap on the same data track (comparative), TE rate=55% at an overlap of the ends 60' and 3'.

Seventh Embodiment (Corresponding to FIG. 12)

(i) When the ends 60' and 5' do not overlap on the same data track (inventive), TE rate=85% at both ends 60', 60' across the width Wws of the write shield layer 60; and TE rate=91% at both ends 5', 5' across the width Wss1 of the upper first read shield layer 5.

(ii) When the ends 60' and 5' overlap on the same data track (comparative), TE rate=60% at an overlap of the ends 60' and 5'.

Eighth Embodiment (Corresponding to FIG. 13)

(i) When the ends 60' and 5' do not overlap on the same data track (inventive), TE rate=80% at both ends 60', 60' across the width Wws of the write shield layer 60 across the; and TE rate=91% at both ends 5', 5' across the width Wss1 of the upper first read shield layer 5.

(ii) When the ends 60' and 5' overlap on the same data track (comparative), TE rate=55% at an overlap of the ends 60' and 5'.

Ninth Embodiment (Corresponding to FIG. 14)

(i) When the ends 60' and 7' do not overlap on the same data track (inventive), TE rate=85% at both ends 60', 60' across the width Wws of the write shield layer 60; and TE rate=92% at both ends 7', 7' across the width Wss2 of the upper second read shield layer 7.

(ii) When the ends 60' and 7' overlap on the same data track (comparative), TE rate=60% at an overlap of the ends 60' and 7'.

Tenth Embodiment (Corresponding to FIG. 15)

(i) When the ends 60' and 7' do not overlap on the same data track (inventive), TE rate=80% at both ends 60', 60' across the width Wws of the write shield layer 60 across the; and TE rate=92% at both ends 7', 7' across the width Wss2 of the upper second read shield layer 7.

(ii) When the ends 60' and 7' overlap on the same data track (comparative), TE rate=55% at an overlap of the ends 60' and 7'.

The effectiveness of the invention could be appreciated from the aforesaid results. That is, there is a fairly good effect of the invention obtained in that the already written signals are kept back from degradation when there is an external magnetic field applied, because the edges of the write shield layer and the edges of the given read shield layer do not overlap until the skew angle is past the maximum skew angle $\alpha_{max}$.

We claim:

1. A magnetic recording/reproducing system, comprising:
a thin-film magnetic head;
a recording medium; and
a drive unit configured to rotationally drive said recording medium in a constant direction and configured to move said thin-film magnetic head substantially in a radial direction of said recording medium, wherein
said recording medium has data tracks configured to record data information,
said recording medium and said magnetic head are located in such a relation as to make a skew angle in a circumferential direction of at least some data tracks of said recording medium, said skew angle having a maximum $\alpha_{max}$,
said thin-film magnetic head includes a recording head portion configured to record magnetic information on said recording medium and a reproducing head portion configured to reproduce the magnetic information recorded on said recording medium,
said recording head portion includes,
a thin-film coil configured to generate magnetic flux,
a magnetic pole layer extending rearward from an air bearing surface and configured to generate a magnetic field on a basis of the magnetic flux generated at said thin-film coil so that said recording medium is magnetized in a direction orthogonal to a surface thereof, said air bearing surface being a surface opposite to said recording medium, and
a write shield layer located on a side of said magnetic pole layer in a direction of travel of said medium and extending rearward from said air bearing surface so that said write shield layer is isolated by a gap layer from said magnetic pole layer on a side near said air bearing surface,
said reproducing head portion includes,
a magneto-resistive effect device, and an upper read shield layer and a lower read shield layer located below said upper read shield layer so as to magnetically shield off said magneto-resistive effect device,
and wherein at least a portion of said magnetic pole layer is disposed between the write shield layer and the reproducing head portion,
said upper read shield layer and said lower read shield layer extend rearward from the air bearing surface,
said write shield layer lies substantially at the air bearing surface,
said upper read shield layer and said lower read shield layer lie substantially at the air bearing surface, and said lower read shield layer is spaced further away from said write shield layer than said upper read shield layer in a thickness direction, and
both ends of said write shield layer at the air bearing surface in a width direction, both ends of said upper read shield layer at the air bearing surface in the width direction and both ends of said lower read shield layer at the air bearing surface in the width direction are positioned and set such that until said skew angle is past said maximum skew angle $\alpha_{max}$, both ends of said write shield layer at the air bearing surface in the width direction do not overlap either both ends of said upper read shield layer at the air bearing surface in the width direction or both ends of said lower read shield layer at the air bearing surface in the width direction, on a same track.

2. The magnetic recording/reproducing system according to claim 1, wherein:
said write shield layer lies substantially at the air bearing surface, and has a width Wws at the air bearing surface,
said upper read shield layer and said lower read shield layer lie substantially at the air bearing surface, and said lower read shield layer is spaced further away from said write shield layer than said upper read shield layer in the thickness direction, and said lower read shield layer has a width Wsf at the air bearing surface, and
a rectangle drawn by connecting both ends across the width Wws of said write shield layer at the air bearing surface with both ends across the width Wsf of said lower read shield layer at the air bearing surface takes on a regular trapezoidal shape with two equal base angles, and is set in such a way as to satisfy:

$Wws < Wsf - 2X \cdot \tan \alpha_{max}$ when $Wws < Wsf$, and  (i) condition $Wws > Wsf + 2X \cdot \tan \alpha_{max}$ when $Wws > Wsf$,  (ii) condition where X is a maximum distance (corresponding to a trapezoid height) between said write shield layer and said lower read shield layer in the thickness direction.

3. The magnetic recording/reproducing system according to claim 2, wherein said upper read shield layer has a width Wss at the air bearing surface, wherein Wss is set in such a way as to satisfy the following relation: Wss≦Wsf, where Wsf is the width of said lower read shield layer.

4. The magnetic recording/reproducing system according to claim 3, wherein Wss is set in such a way as to satisfy the following relation: Wss<Wsf.

5. The magnetic recording/reproducing system according to claim 2, wherein said upper read shield layer is divided into two shield layers via a nonmagnetic layer in the thickness direction, and said upper read shield layer has an upper first read shield layer and an upper second read shield layer from below,
said upper first read shield layer has a width Wss1 at the air bearing surface, and said upper second read shield layer has a width Wss2 at the air bearing surface, and
of said Wss1, said Wss2 and said Wsf, said Wsf is greatest.

6. The magnetic recording/reproducing system according to claim 2, wherein said upper read shield layer is divided into two shield layers via a nonmagnetic layer in the thickness direction, wherein said upper read shield layer has an upper first read shield layer and an upper second read shield layer from below;
said upper first read shield layer has a width Wss1 at the air bearing surface, and said upper second read shield layer has a width Wss2 at the air bearing surface;
of said Wss1, said Wss2 and said Wsf, said Wss1 is greatest; and
a rectangle drawn by connecting both ends across the width Wws of said write shield layer at the air bearing surface with both ends across the width Wss1 of said upper first read shield layer at the air bearing surface takes on a regular trapezoidal shape with two equal base angles, and is set in such a way as to satisfy:

$Wws < Wss1 - 2X1 \cdot \tan \alpha_{max}$ when $Wws < Wss1$, and  (i) condition $Wws > Wss1 + 2X1 \cdot \tan \alpha_{max}$ when $Wws > Wss1$,  (ii) condition where X1 is a maximum distance (corresponding to a trapezoid height) between said write shield layer and said upper first read shield layer in the thickness direction.

7. The magnetic recording/reproducing system according to claim 2, wherein said upper read shield layer is divided into two shield layers via a nonmagnetic layer in the thickness direction, wherein said upper read shield layer has an upper first read shield layer and an upper second read shield layer from below;
said upper first read shield layer has a width Wss1 at the air bearing surface, and said upper second read shield layer has a width Wss2 at the air bearing surface;
of said Wss1, said Wss2 and said Wsf, said Wss2 is greatest; and
a rectangle drawn by connecting both ends across the width Wws of said write shield layer at the air bearing surface with both ends across the width Wss2 of said upper second read shield layer at the air bearing surface takes on a regular trapezoidal shape with two equal base angles, and is set in such a way as to satisfy:

$Wws < Wss2 - 2X2 \cdot \tan \alpha_{max}$ when $Wws < Wss2$, and  (i) condition $Wws > Wss2 + 2X2 \cdot \tan \alpha_{max}$ when $Wws > Wss2$,  (ii) condition where X2 is a maximum distance (corresponding to a trapezoid height) between said write shield layer and said upper second read shield layer in the thickness direction.

8. The magnetic recording/reproducing system according to claim 1, wherein the data tracks of said recording medium include a perpendicular magnetic recording layer, which has an underlay soft magnetic layer for assisting a perpendicular magnetic flux.

9. The magnetic recording/reproducing system according to claim 8, wherein the magnetic pole layer is configured to generate a recording magnetic field which passes perpendicularly through said perpendicular magnetic recording layer to make perpendicular magnetic records on said perpendicular magnetic recording layer.

10. The magnetic recording/reproducing system according to claim 1, wherein said magnetic pole layer includes a main magnetic pole layer that extends rearward from the air bearing surface and is configured to generate a magnetic field on the basis of the magnetic flux generated at said thin-film coil so that said recording medium is magnetized in a direction orthogonal to a surface thereof, and an auxiliary magnetic pole layer that extends rearward from a first position receded from said magnetic recording opposite surface, and said main magnetic pole layer and said auxiliary magnetic pole layer are stacked one upon another.

11. The magnetic recording/reproducing system according to claim 1, wherein said write shield layer includes a first magnetic shield portion that extends along said gap layer from said air bearing surface to a second position in front of a first position, and a second magnetic shield layer portion that extends from said air bearing surface to at least said back gap while extending partially over said first magnetic shield portion.

12. The magnetic recording/reproducing system according to claim 1, wherein:
said write shield layer is coupled to said magnetic pole layer through a back gap on a side far away from said air bearing surface.

13. The magnetic recording/reproducing system according to claim 1, wherein the portion of said magnetic pole layer that is disposed between the write shield layer and the reproducing head portion is disposed between the write shield layer and the reproducing head portion at the air bearing surface.

14. A thin-film magnetic head, comprising:
- a recording head portion configured to record magnetic information on a recording medium; and
- a reproducing head portion configured to reproduce the magnetic information recorded on said recording medium, wherein said recording head portion includes,
- a thin-film coil configured to generate magnetic flux,
- a magnetic pole layer extending rearward from an air bearing surface and configured to generate a magnetic field on a basis of the magnetic flux generated at said thin-film coil so that said recording medium is magnetized in a direction orthogonal to a surface thereof, said air bearing surface being a surface opposite to said recording medium, and
- a write shield layer located on a side of said magnetic pole layer in a direction of travel of said medium and extending rearward from said air bearing surface so that said write shield layer is isolated by a gap layer from said magnetic pole layer on a side near said air bearing surface, an end portion of said magnetic pole layer at the air bearing surface is defined by an inverted trapezoidal shape in section at the air bearing surface wherein in consideration of relative movement to the recording medium, a short side is defined by a width W4 of a lower end edge positioned on a leading side, a long side is defined by a width W1 of an upper end edge positioned on a trailing side where W4<W1, and a height is defined by a thickness direction, wherein a bevel angle β defined by side and thickness-direction lines of said inverted trapezoidal shape is set at a same angle as a maximum skew angle $\alpha_{max}$, said reproducing head portion includes,
- a magneto-resistive effect device, and an upper read shield layer and a lower read shield layer located below said upper read shield layer so as to magnetically shield off said magneto-resistive effect device, and wherein at least a portion of said magnetic pole layer is disposed between the write shield layer and the reproducing head portion, said upper read shield layer and said lower read shield layer extend rearward from the air bearing surface, said write shield layer lies substantially at the air bearing surface, said upper read shield layer and said lower read shield layer lie substantially at the air bearing surface, and said lower read shield layer is spaced further away from said write shield layer than said upper read shield layer in the thickness direction, and both ends of said write shield layer at the air bearing surface in a width direction, both ends of said upper read shield layer at the air bearing surface in the width direction and both ends of said lower read shield layer at the air bearing surface in the width direction are positioned and set such that until said skew angle is past said maximum skew angle $\alpha_{max}$, both ends of said write shield layer at the air bearing surface in the width direction do not overlap either both ends of said upper read shield layer at the air bearing surface in the width direction or both ends of said lower read shield layer at the air bearing surface in the width direction, on a same track.

15. The thin-film magnetic head according to claim 14, wherein:
said write shield layer is coupled to said magnetic pole layer through a back gap on a side far away from said air bearing surface.

16. The thin-film magnetic head according to claim 14, wherein the portion of said magnetic pole layer that is disposed between the write shield layer and the reproducing head portion is disposed between the write shield layer and the reproducing head portion at the air bearing surface.

* * * * *